United States Patent
Yamaura et al.

(10) Patent No.: US 7,430,168 B2
(45) Date of Patent: Sep. 30, 2008

(54) WIRELESS COMMUNICATION APPARATUS, WIRELESS COMMUNICATION METHOD, AND COMPUTER PROGRAM

(75) Inventors: Tomoya Yamaura, Tokyo (JP); Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 11/189,829

(22) Filed: Jul. 27, 2005

(65) Prior Publication Data

US 2006/0023669 A1 Feb. 2, 2006

(30) Foreign Application Priority Data

Jul. 28, 2004 (JP) ............................. 2004-220855

(51) Int. Cl.
*H04L 1/00* (2006.01)
(52) U.S. Cl. .................... 370/230.1; 370/204; 370/334; 455/101; 455/562.1; 455/575.7; 700/53; 375/267
(58) Field of Classification Search ................. 370/328, 370/335, 336, 449, 294, 204, 230.1, 334, 370/342; 455/63.4, 132, 562.1, 101, 277.2, 455/343.3, 504, 574, 575.1; 700/53; 375/267
See application file for complete search history.

(56) References Cited

U.S. PATENT DOCUMENTS

| | | | |
|---|---|---|---|
| 6,965,788 B1 * | 11/2005 | Barratt et al. ............... | 455/574 |
| 7,142,824 B2 * | 11/2006 | Kojima et al. ................ | 455/78 |
| 7,289,481 B2 * | 10/2007 | Wax et al. .................... | 370/338 |
| 2003/0123384 A1 * | 7/2003 | Agee ........................... | 370/208 |
| 2003/0235147 A1 * | 12/2003 | Walton et al. ................ | 370/204 |
| 2005/0085197 A1 * | 4/2005 | Laroia et al. ................. | 455/101 |
| 2005/0135295 A1 * | 6/2005 | Walton et al. ................ | 370/328 |
| 2005/0233709 A1 * | 10/2005 | Gardner et al. .............. | 455/101 |
| 2005/0250452 A1 * | 11/2005 | Walton et al. ............... | 455/63.4 |

* cited by examiner

*Primary Examiner*—William Trost
*Assistant Examiner*—James D Ewart
(74) *Attorney, Agent, or Firm*—Oblon, Spivak, McClelland, Maier & Neustadt, P.C.

(57) ABSTRACT

Disclosed are a wireless communication apparatus, a wireless communication method, and a computer program for intercommunication between a plurality of wireless stations. In a reception standby state, packet detection is performed by using a part of the plurality of reception branches to disable the reception operation of the remaining reception branches that do not perform packet detection, and thereby reducing the power consumption during packet detection standby. Further, in a packet reception state, only the minimum necessary number of reception branches for receiving signal that is spatially multiplexed is enabled by MIMO transmission, and thereby reducing the power consumption also during reception of MIMO signals.

20 Claims, 16 Drawing Sheets

→ PACKET DETECTION SIGNAL

┈┈▹ ENABLE/DISABLE CONTROL SIGNAL

╌╌▹ NUMBER-OF-SPATIALLY-MULTIPLEXED-CHANNELS NOTIFICATION SIGNAL

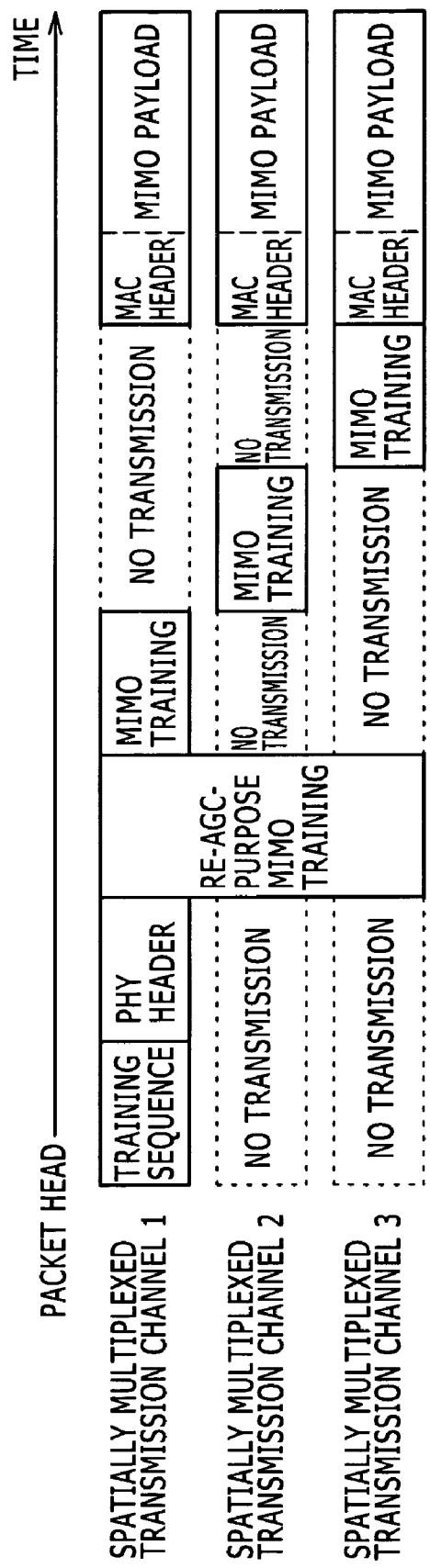

FIG.4

SPATIALLY MULTIPLEXED TRANSMISSION CHANNEL 1

| Subcarrier 01 | NO TRANSMISSION | NO TRANSMISSION |
|---|---|---|
| NO TRANSMISSION | Subcarrier 02 | NO TRANSMISSION |
| NO TRANSMISSION | NO TRANSMISSION | Subcarrier 03 |
| Subcarrier 04 | NO TRANSMISSION | NO TRANSMISSION |
| NO TRANSMISSION | Subcarrier 05 | NO TRANSMISSION |
| NO TRANSMISSION | NO TRANSMISSION | Subcarrier 06 |
| Subcarrier 07 | NO TRANSMISSION | NO TRANSMISSION |
| NO TRANSMISSION | Subcarrier 08 | NO TRANSMISSION |
| NO TRANSMISSION | NO TRANSMISSION | Subcarrier 09 |
| Subcarrier 10 | NO TRANSMISSION | NO TRANSMISSION |
| NO TRANSMISSION | Subcarrier 11 | NO TRANSMISSION |
| NO TRANSMISSION | NO TRANSMISSION | Subcarrier 12 |

SPATIALLY MULTIPLEXED TRANSMISSION CHANNEL 2

| NO TRANSMISSION | NO TRANSMISSION | Subcarrier 01 |
|---|---|---|
| Subcarrier 02 | NO TRANSMISSION | NO TRANSMISSION |
| NO TRANSMISSION | Subcarrier 03 | NO TRANSMISSION |
| NO TRANSMISSION | NO TRANSMISSION | Subcarrier 04 |
| Subcarrier 05 | NO TRANSMISSION | NO TRANSMISSION |
| NO TRANSMISSION | Subcarrier 06 | NO TRANSMISSION |
| NO TRANSMISSION | NO TRANSMISSION | Subcarrier 07 |
| Subcarrier 08 | NO TRANSMISSION | NO TRANSMISSION |
| NO TRANSMISSION | Subcarrier 09 | NO TRANSMISSION |
| NO TRANSMISSION | NO TRANSMISSION | Subcarrier 10 |
| Subcarrier 11 | NO TRANSMISSION | NO TRANSMISSION |
| NO TRANSMISSION | Subcarrier 12 | NO TRANSMISSION |

SPATIALLY MULTIPLEXED TRANSMISSION CHANNEL 3

| NO TRANSMISSION | Subcarrier 01 | NO TRANSMISSION |
|---|---|---|
| NO TRANSMISSION | NO TRANSMISSION | Subcarrier 02 |
| Subcarrier 03 | NO TRANSMISSION | NO TRANSMISSION |
| NO TRANSMISSION | Subcarrier 04 | NO TRANSMISSION |
| NO TRANSMISSION | NO TRANSMISSION | Subcarrier 05 |
| Subcarrier 06 | NO TRANSMISSION | NO TRANSMISSION |
| NO TRANSMISSION | Subcarrier 07 | NO TRANSMISSION |
| NO TRANSMISSION | NO TRANSMISSION | Subcarrier 08 |
| Subcarrier 09 | NO TRANSMISSION | NO TRANSMISSION |
| NO TRANSMISSION | Subcarrier 10 | NO TRANSMISSION |
| NO TRANSMISSION | NO TRANSMISSION | Subcarrier 11 |
| Subcarrier 12 | NO TRANSMISSION | NO TRANSMISSION |

TIME →

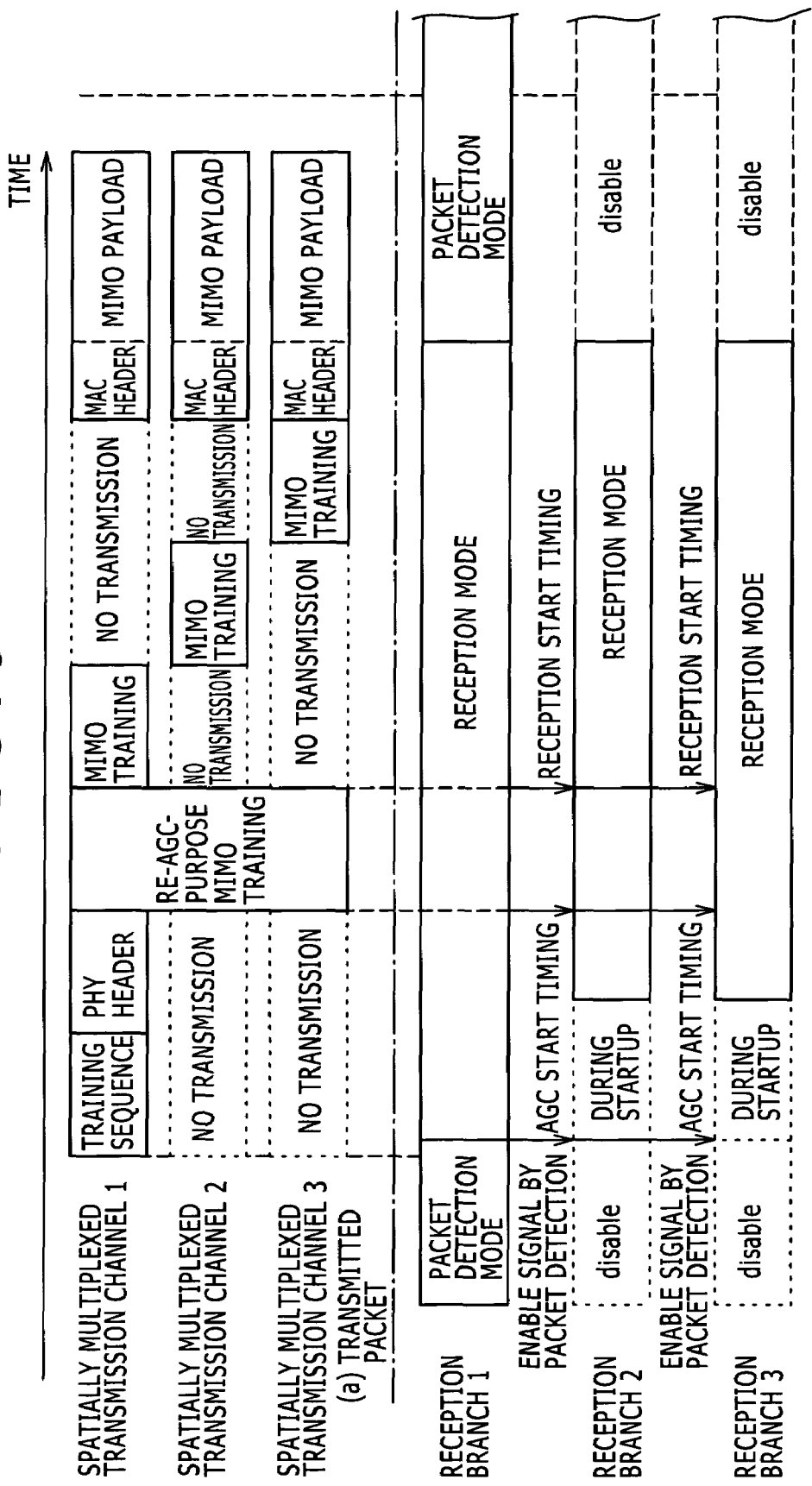

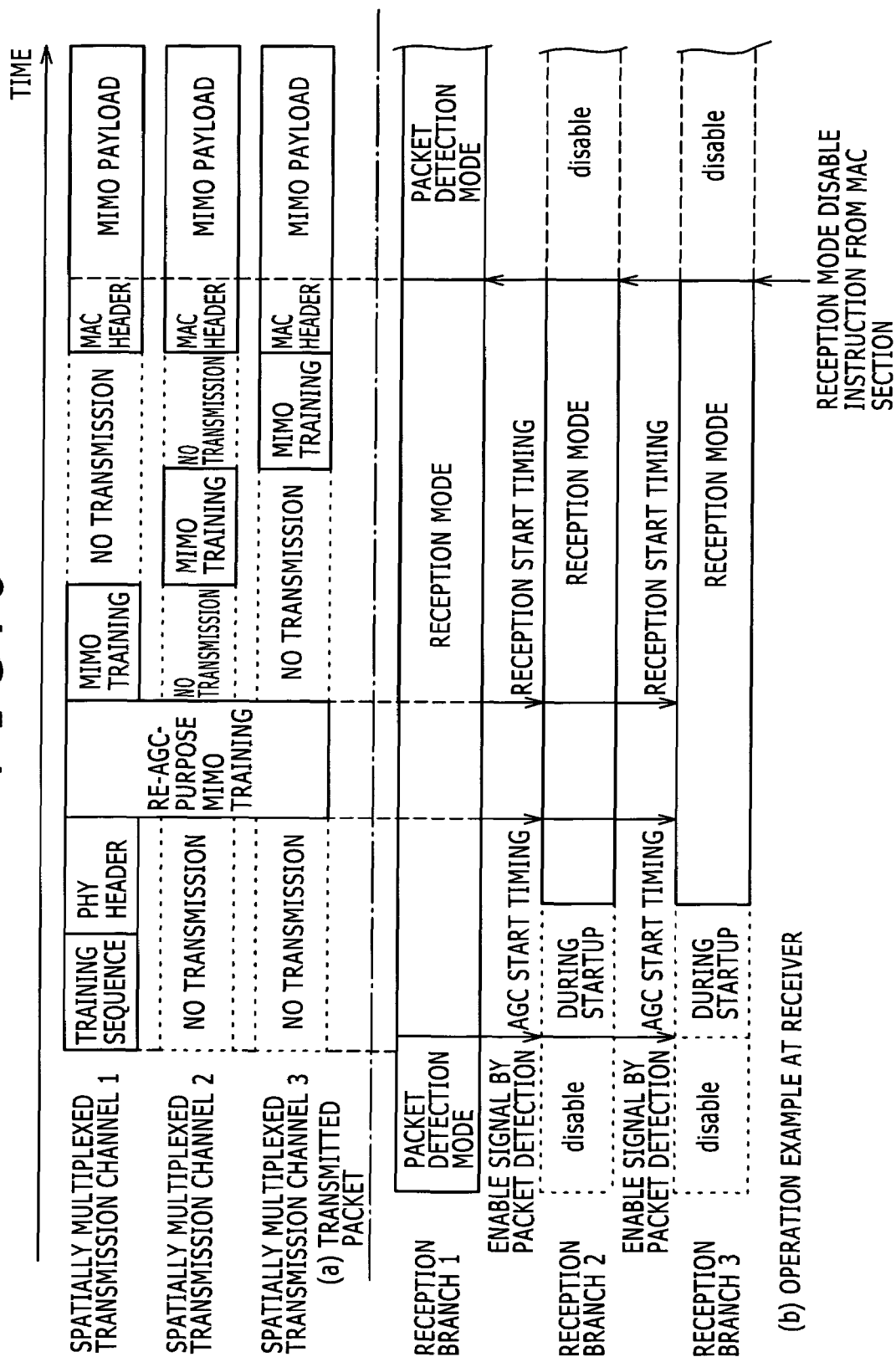

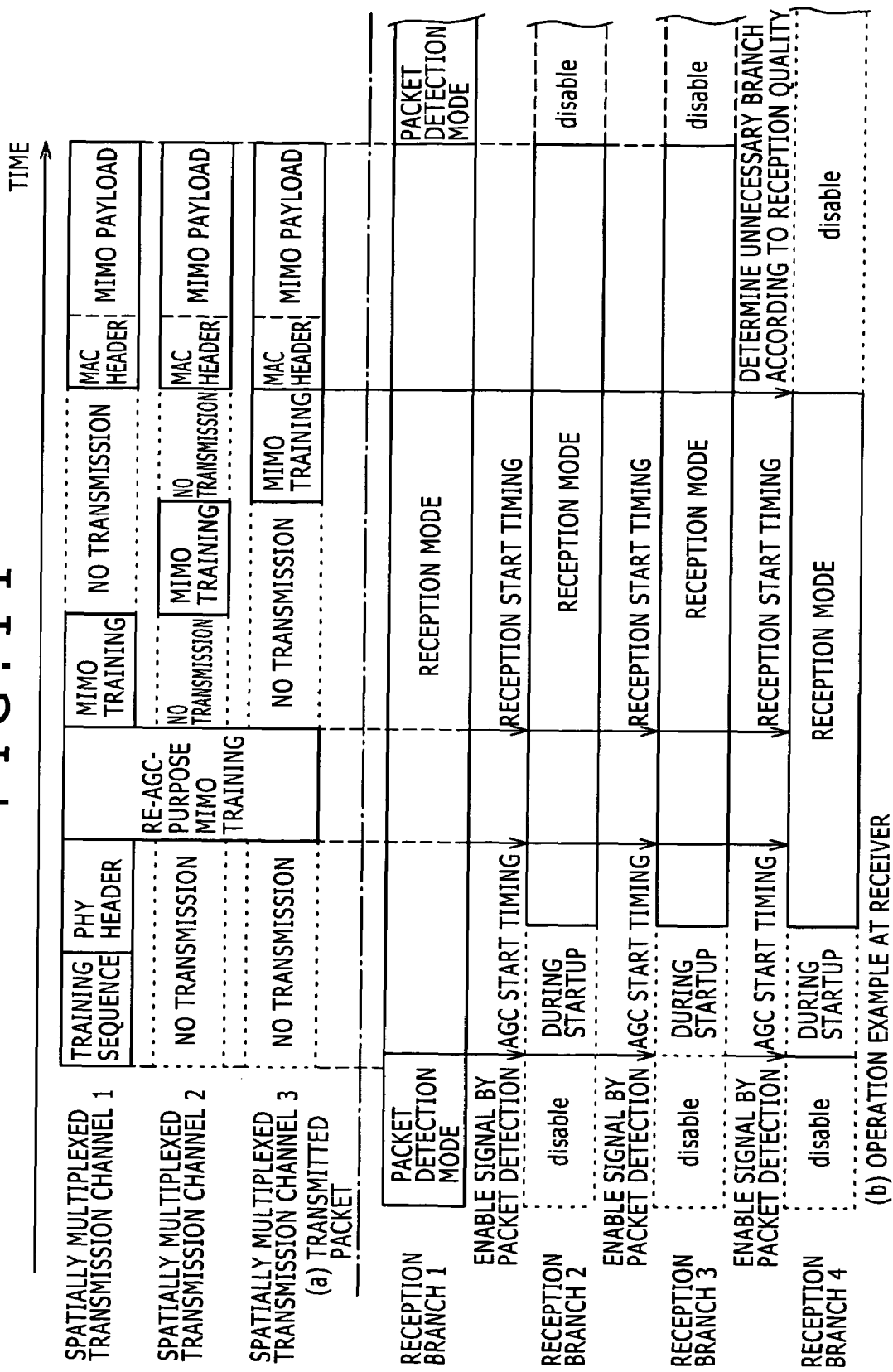

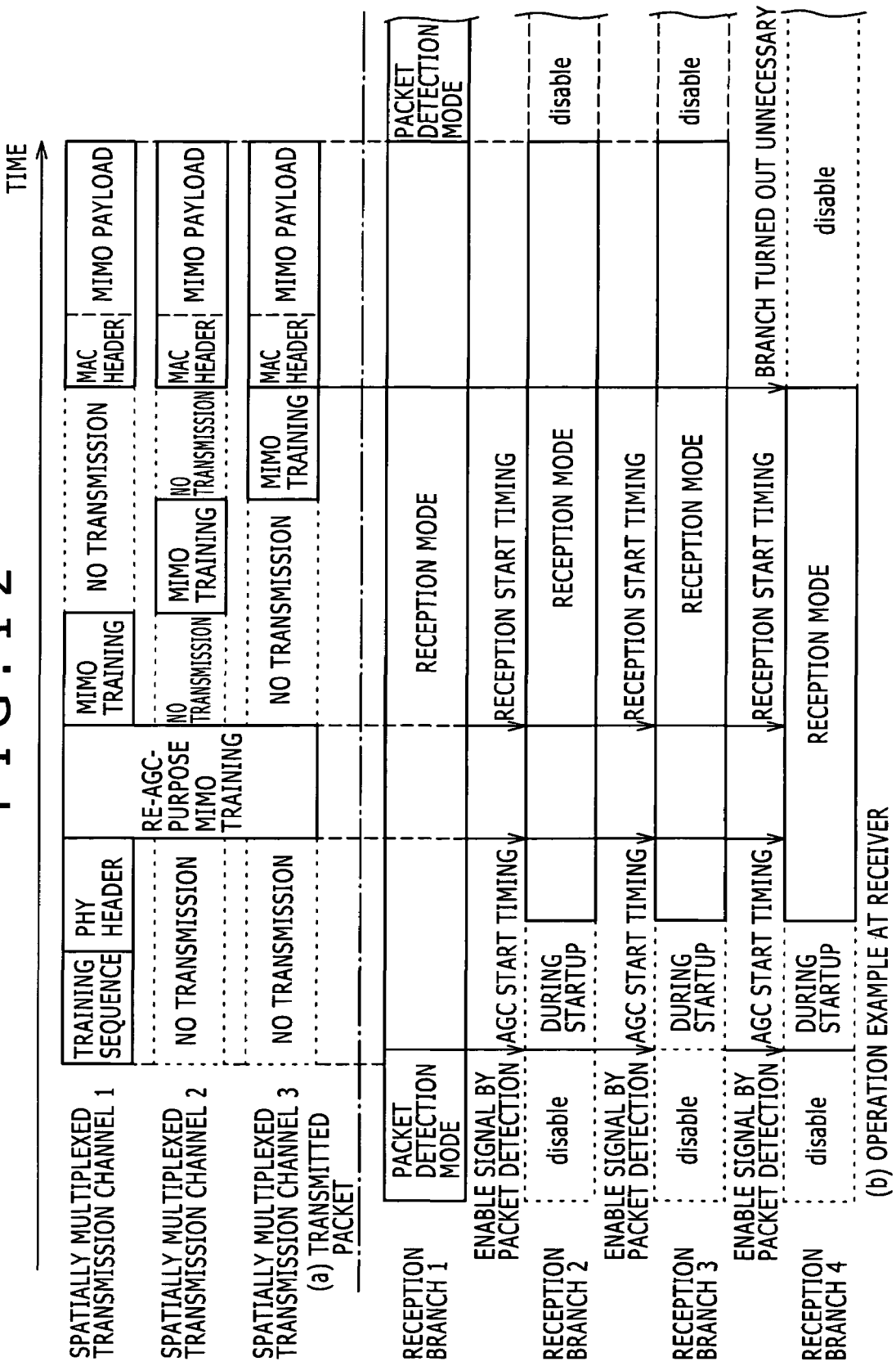

F I G . 1 3
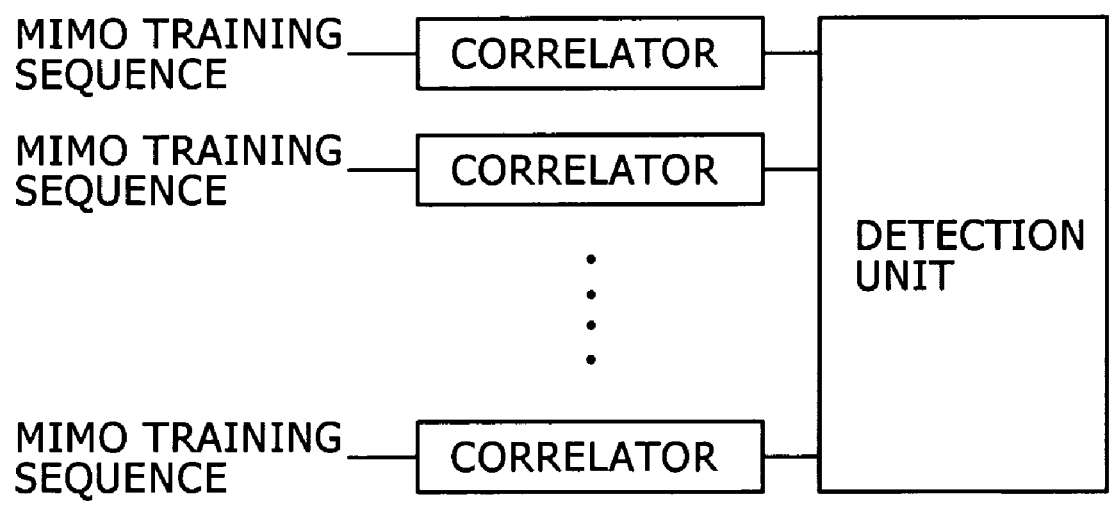

WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application JP 2004-220855 filed in the Japanese Patent Office on Jul. 28, 2004, the entire contents of which being incorporated herein by reference.

BACKGROUND OF THE INVENTION

1. Field of the Invention

The present invention relates to a wireless communication apparatus, a wireless communication method, and a computer program for intercommunication between a plurality of wireless stations. In particular, the present invention concerns a wireless communication apparatus, a wireless communication method, and a computer program for expanding transmission capacity by carrying out MIMO (Multi Input Multi Output) communication which utilizes spatial multiplexing and forms a plurality of logical channels, pairing a transmitter having a plurality of antennas with a receiver having a plurality of antennas.

More specifically, the present invention relates to a wireless communication apparatus, a wireless communication method, and a computer program for reducing power consumption during reception of spatially multiplexed MIMO signals. In particular, the present invention concerns a wireless communication apparatus, a wireless communication method, and a computer program for reducing power consumption during packet detection standby and power consumption during reception of spatially multiplexed signals.

2. Description of the Related Art

Computer networking including a LAN can efficiently realize the sharing of information resources and the sharing of equipment resources. Nowadays, attention is being given to a wireless LAN as a system that frees users from cabling of conventional wired LANs. The wireless LAN can eliminate most of cables from workspaces such as offices. Accordingly, it is possible to relatively easily move communication terminals such as personal computers (PCs).

In recent years, there is remarkably increasing demand for wireless LAN systems as they achieve higher speeds and become available at reduced costs. Particularly, introduction of a personal area network (PAN) is being considered to construct small-scale networks for information communication between electronic devices available around users. For example, some different wireless communication systems and wireless communication apparatuses have been standardized by utilizing such frequency bands as 2.4 GHz and 5 GHz which require no license from an administrative government office.

Canonical standards concerning wireless networks can include IEEE (The Institute of Electrical and Electronics Engineers) 802.11 (e.g., see non-patent document 1), Hiper-LAN/2 (e.g., see non-patent document 2 or 3), IEEE802.15.3, and Bluetooth communication, for example. The IEEE802.11 has enhanced standards such as IEEE802.11a (e.g., see non-patent document 4), b, g . . . depending on differences of wireless communication systems and frequency bands.

IEEE802.11a supports a modulation scheme for achieving a maximum communication speed of 54 Mbps. However, there is desired a standard for realizing a higher bit rate for the communication speed. For example, in IEEE802,11n, with the aim of establishing a wireless LAN technology for realizing a high speed exceeding an actual throughput of 100 Mbps, the next generation of wireless LAN standards is being developed.

As a technology for realizing a higher speed of wireless communication, MIMO (Multi-Input Multi-Output) communication is coming to attention. This is a technology for expanding transmission capacity and achieving improvement in communication speed by realizing spatially multiplexed transmission channels (hereinafter also referred to as "MIMO channel") with a plurality of antenna elements at a transmitter and a receiver respectively. In the MIMO communication, good frequency utilization efficiency is obtained due to utilization of spatial multiplexing.

FIG. 16 schematically shows a MIMO communication system. As shown in FIG. 16, a transmitter and a receiver are equipped with a plurality of antennas respectively. The transmitter performs space-time coding on a plurality of transmission signals, which are then multiplexed, distributed to M antennas, and transmitted to a plurality of MIMO channels. The receiver performs space-time decoding on reception signals received by N antennas via the channels to obtain reception data. In this case, a channel model is composed of a radio wave environment around the transmitter (transfer function), a structure of channel space (transfer function), and a radio wave environment around the receiver (transfer function). In the case of multiplexing signals transmitted from each antenna, there occurs crosstalk. However, by processing signals at the receiver, each multiplexed signal can be extracted properly without crosstalk.

In a MIMO communication scheme, the transmitter distributes transmission data to a plurality of antennas and transmits it through a plurality of spatially-multiplexed virtual MIMO channels, and the receiver obtains reception data by processing signals received by a plurality of antennas. In this manner, the MIMO communication scheme utilizes channel characteristics and differs from a mere transmission/reception adaptive array.

There are proposed a variety of configuration schemes for realizing MIMO transmission. However, it is a big issue on implementation how channel information is exchanged between a transmitter and a receiver in accordance with an antenna configuration. In the case of exchanging the channel information, it is easy to perform a method of transmitting known information (preamble information) only from the transmitter to the receiver. In this case, the transmitter and the receiver are independent of each other and perform spatial multiplexing transmission. This is called an open-loop type of MIMO transmission scheme. As an extension of the open-loop type, there is a closed-loop type of MIMO transmission scheme for producing ideal spatial orthogonal channels between the transmitter and the receiver by feedback of preamble information also from the receiver to the transmitter.

The open-loop type of MIMO transmission scheme can include V-BLAST (Vertical Bell Laboratories Layered Space Time) scheme for example (e.g., see patent document 1). Further, as an ideal form for the closed-loop type of MIMO transmission, there is known an SVD-MIMO scheme utilizing singular value decomposition (SVD) of a propagation path function (e.g., see non-patent document 5).

In this manner, according to the MIMO transmission scheme, by using a plurality of spatially multiplexed channels in parallel between the transmitter having a plurality of transmit antennas and the receiver having a plurality of receive antennas, transmission speed between the transmitter and the receiver can be improved using a limited bandwidth.

However, from the viewpoint of power consumption at the receiver, the introduction of the MIMO transmission scheme brings about a problem. In the case of receiving a signal from one transmission device (no introduction of a MIMO technology), one reception device is generally enough to work. Assume that power consumption at the receiver in this case is represented by P [W]. On the other hand, in the case of a MIMO receiver having n reception branches, the electric power for reception comes to P×n[W], with a simple calculation. That is, in the MIMO transmission scheme, an increase in the number of branches forms more MIMO channels which can realize higher-speed transmission with a limited bandwidth; however, the power consumption increases in rough proportion to the number of branches.

This is not particularly a problem for devices powered from external power supplies such as stationary TV and PC. However, this affects usability of portable devices powered from batteries such as PDA (Personal Digital Assistant) since the battery life varies with the power consumption. Further, from the viewpoint of the environment or the social ecology, a power saving is also required for stationary devices powered from commercial AC power.

It is unavoidable that the power consumption increases in rough proportion to the number of branches at the time of receiving spatially-multiplexed signals with MIMO in reality. However, since it is necessary that a wireless communication apparatus is in a reception standby state or watches statuses of media even during no data transmission, there is a problem on the power consumption. That is, a receiver spends most of the time on packet detection, and the wasted power becomes excessive if the receiver goes on reception standby with a plurality of reception branches during this period.

[Patent document 1] Japanese Unexamined Patent Publication No. Hei 10-84324

[Non-patent document 1] International Standard ISO/IEC 8802-11:1999 (E) ANSI/IEEE Std 802.11, 1999 Edition, Part11: Wireless LAN Medium Access Control (MAC) and Physical Layer (PHY) Specifications

[Non-patent document 2] ETSI Standard ETSI TS 101 761-1 V1.3.1 Broadband Radio Access Networks (BRAN); HIPERLAN Type 2; Data Link Control (DLC) Layer; Part1: Basic Data Transport Functions

[Non-patent document 3] ETSI TS 101 761-2 V1.3.1 Broadband Radio Access Networks (BRAN); HIPERLAN Type 2; Data Link Control (DLC) Layer; Part2: Radio Link Control (RLC) sublayer

[Non-patent document 4] Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band

[Non-patent document 5] http://radio3.ee.uec.ac.jp/MIMO (IEICE_TS).pdf (as of Oct. 24, 2003)

SUMMARY OF THE INVENTION

It is desirable to provide a wireless communication apparatus, a wireless communication method, and a computer program excellent at being able to expand transmission capacity by carrying out MIMO communication which utilizes spatial multiplexing and forms a plurality of logical channels, pairing a transmitter having a plurality of antennas with a receiver having a plurality of antennas.

It is also desirable to provide a wireless communication apparatus, a wireless communication method, and a computer program excellent at being able to reduce power consumption during reception of spatially multiplexed MIMO signals.

It is also desirable to provide a wireless communication apparatus, a wireless communication method, and a computer program excellent at being able to reduce power consumption during packet detection standby and power consumption during reception of spatially multiplexed signals.

According to a first embodiment of the present invention, there is provided a wireless communication apparatus for performing packet communication using a plurality of transmission channels formed by spatial multiplexing. The wireless communication apparatus includes a plurality of reception branches configured to receive a spatially multiplexed wireless signal, a signal processor configured to process a signal received at each reception branch, and a controller configured to enable and disable each reception branch in accordance with a reception operation state.

The present invention relates to a MIMO transmission technology for expanding transmission capacity by carrying out communication which utilizes spatial multiplexing and forms a plurality of logical channels, pairing a transmitter having a plurality of antennas with a receiver having a plurality of antennas. According to a MIMO transmission scheme, by using a plurality of spatially multiplexed channels in parallel between a transmitter having a plurality of transmit antennas and a receiver having a plurality of receive antennas, transmission speed between the transmitter and the receiver can be improved using a limited bandwidth.

However, in the MIMO transmission scheme, there is a problem that the power consumption required for communication operation increases in rough proportion to the number of branches used. For example, the receiver spends most of the time on reception standby of packet detection, and the wasted power becomes excessive if the receiver goes on reception standby with a plurality of reception branches during this period.

On the other hand, a wireless communication apparatus according to an embodiment of the invention, in a reception standby state, performs packet detection using a part of the plurality of reception branches and disables the reception operation of the remaining reception branches that do not perform packet detection, thereby reducing the power consumption during packet detection standby.

A minimum of one reception branch is enough to detect a packet. In this case, even one reception branch can perform packet detection, for example, at a signal section of a packet head that is not spatially multiplexed.

Further, a wireless communication apparatus according to an embodiment of the invention transitions to a packet reception state in response to detection of a packet, enables reception branches that are disabled in a reception standby state, and allows the reception branches to receive a spatially multiplexed signal.

In the MIMO transmission scheme, the number of spatially multiplexed channels to be formed corresponds to, at the maximum (i.e., ideally), either the number of transmission branches at a transmitter or the number of reception branches at a receiver, whichever is smaller. For this reason, the receiver does not always require all reception branches to perform reception processing on a spatially multiplexed transmission signal.

In the packet reception state, the wireless communication apparatus may enable only the necessary number of reception branches for receiving a spatially multiplexed signal and allow them to perform reception processing. That is, the wireless communication apparatus enables only the minimum necessary number of reception branches for receiving a signal that is spatially multiplexed by MIMO transmission, thereby reducing the power consumption also during reception of MIMO signals.

In the packet reception state, a necessary-number-of-branches determination device determines the necessary number of reception branches for receiving a spatially multiplexed signal. Next, an unnecessary-branch selector selects reception branches unnecessary to receive a spatially multiplexed signal out of the plurality of reception branches based on a result of determining the necessary number of branches. Further, a branch disable device disables the reception operation of reception branches selected as unnecessary branches.

The necessary-number-of-branches determination device can determine the necessary number of reception branches based on, for example, a description of a header section in a spatially multiplexed packet received or a reception state of the packet.

Further, the unnecessary-branch selector can obtain reception quality information of each reception branch and select unnecessary branches in decreasing order of reception quality, the number of unnecessary branches being a difference between the total number of branches and the necessary number of branches. The reception quality information in this context can include full electric power for reception, amplitude flatness of a subcarrier after FFT (in the case of adopting an OFDM modulation scheme), a size of a determinant or a rank of a channel matrix estimated from a variety of combinations of reception branches, and the like.

Further, in the packet reception state, the wireless communication apparatus transitions to the reception standby state if it is detected that an address of the wireless communication apparatus is not included in a destination of the packet and disables the reception operation of reception branches that do not perform packet detection. This processing prevents reception branches from receiving an unnecessary spatially-multiplexed packet; therefore, power consumption can be reduced.

As described above, a wireless communication apparatus according to an embodiment of the invention can reduce power consumption on average, including the power consumption during packet detection and during reception of spatially multiplexed packets. As a result of reducing power consumption on average, the battery size and capacity for devices powered from batteries can be decreased, thereby rendering a portable wireless device more compact and lightweight and lowering its cost. Further, reducing power consumption on average can suppress the amount of heat generated by devices, thereby rendering a wireless device more compact and lowering its cost of design and production associated with heat dissipation.

For example, a packet format includes a training sequence that can be received by one reception branch, a PHY header that can be received by one reception branch, a MIMO training sequence that is received by a plurality of reception branches and is transmitted in a time-division manner for each spatially multiplexed channel for the sake of measuring a spatially multiplexed channel, and a MIMO payload that is spatially multiplexed with MIMO.

In this case, in the reception standby state, the packet can be detected by detecting the training sequence that is not spatially multiplexed, using a part of the plurality of reception branches. Further, in response to detection of the packet, the remaining reception branches are enabled, the PHY header being continuously demodulated and decoded with the necessary number of reception branches for packet reception.

There is a case where a destination address of the packet is described in the head section of the MIMO payload. In this case, all reception branches receive the MIMO training sequence and also the destination address of the packet described in the head section of the MIMO payload is demodulated and decoded, so that a destination of the packet can be checked. Further, all reception branches continue the reception operation if the address of the wireless communication apparatus is included in a destination of the packet, and the controller transitions to the reception standby state and disables the reception operation of reception branches that do not perform packet detection if the address of the wireless communication apparatus is not included in a destination of the packet.

Further, in the case where the destination address is described in the PHY header instead of the head section of the MIMO payload (namely, MAC header), it is not necessary that all reception branches perform the reception operation from the packet detection to the head section of the MIMO payload. If it has turned out at the PHY header that the address of the wireless communication apparatus is not included in a destination of the packet, the controller transitions to the reception standby state and disables the reception branches that do not perform packet detection.

Furthermore, the necessary number of reception branches for reception is extracted before the MIMO payload is decoded, and the controller continues enabling only the extracted number of reception branches. For example, in the case where information as to the number of spatially multiplexed channels transmitted is described in the PHY header, a necessary number of reception branches or more continue receiving specified sections (e.g., until the section of the MIMO training sequence) after the packet is detected so that reception quality information of each reception branch is obtained, and using only the necessary number of reception branches selected in decreasing order of reception quality, the subsequent sections of the packet are received. For example, a necessary number of reception branches or more continue receiving a spatially multiplexed signal until at least the end of the head section of the MIMO payload (namely, MAC header) for the sake of determining whether the packet is addressed to the wireless communication apparatus.

Furthermore, in the case where it is specified that the number of spatially multiplexed channels is detected at the time of receiving the MIMO training sequence, a necessary number of reception branches or more continue receiving until the MIMO training sequence. Further, using only the number of reception branches selected based on reception quality that corresponds to the detected number of spatially multiplexed channels, at least the head section of the MIMO payload is received.

According to a second embodiment of the present invention, there is provided a computer program described in computer-readable form so as to allow a computer system to execute processing for performing reception processing on a spatially multiplexed transmission signal using a plurality of reception branches. The computer program includes a reception standby step of performing packet detection using a part of the plurality of reception branches and disabling reception operation of the remaining reception branches that do not perform packet detection, and a packet reception step of enabling reception branches in response to detection of a packet, which are disabled in a reception standby state, in order to allow the reception branches to receive a spatially multiplexed signal.

The computer program according to the second embodiment of the present invention is defined as a computer program described in a computer-readable form so as to implement specified processes on a computer system. In other words, when the computer program according to the second embodiment of the present invention is installed in a computer system, the computer system exhibits cooperative effects. It is possible to provide effects similar to those of the wireless communication apparatus according to the first embodiment of the present invention.

According to the present invention, there are provided a wireless communication apparatus, a wireless communication method, and a computer program excellent at being able to reduce power consumption during reception of a spatially multiplexed MIMO signal.

According to the invention, there are provided a wireless communication apparatus, a wireless communication method, and a computer program excellent at being able to reduce power consumption during packet detection standby and power consumption during reception of a spatially multiplexed signal.

A wireless communication apparatus according to an embodiment of the invention performs packet detection using only the minimum necessary number of reception branches in a reception standby state, thereby reducing the power consumption during packet detection standby.

Further, a wireless communication apparatus according to an embodiment of the invention disables the operation of reception branches unnecessary to receive a spatially multiplexed packet during usual operation of receiving a packet, thereby reducing the power consumption.

Therefore, according to the present invention, it is possible to reduce power consumption on average, including the power consumption during packet detection and during reception of spatially multiplexed packets. As a result of this, the size and capacity of a battery used as a main power source can be decreased, thereby rendering a portable wireless device more compact and lightweight and lowering its cost.

These and other features and advantages of the invention will be apparent from the following more particular description of preferred embodiments of the invention, as illustrated in the accompanying drawings.

BRIEF DESCRIPTION OF THE DRAWINGS

FIG. 3 is a diagram showing an example of a packet format applied to a MIMO transmission scheme.

FIG. 4 is a diagram showing an exemplary structure of subcarrier-interleaved MIMO training sequences.

FIG. 5 is a diagram for explaining a first embodiment of the invention.

FIG. 6 is a diagram for explaining the first embodiment of the invention.

FIG. 11 is a diagram showing an exemplary operation sequence that is realized by the process shown in FIG. 10.

FIG. 12 is a diagram for explaining a third embodiment of the invention.

FIG. 13 is a diagram showing an exemplary configuration of a detector for detecting the number of spatially multiplexed channels.

DESCRIPTION OF THE PREFERRED EMBODIMENTS

Embodiments of the present invention will be described below in detail with reference to the accompanying drawings.

The present invention relates to a MIMO communication system for spatially multiplexing signals to communicate, pairing a transmitter having a plurality of antennas with a receiver having a plurality of antennas. According to the MIMO transmission scheme, by using multiple spatially multiplexed channels in parallel between the transmitter having a plurality of transmit antennas and the receiver having a plurality of receive antennas, transmission speed between the transmitter and the receiver can be improved using a limited bandwidth.

Figure 1:
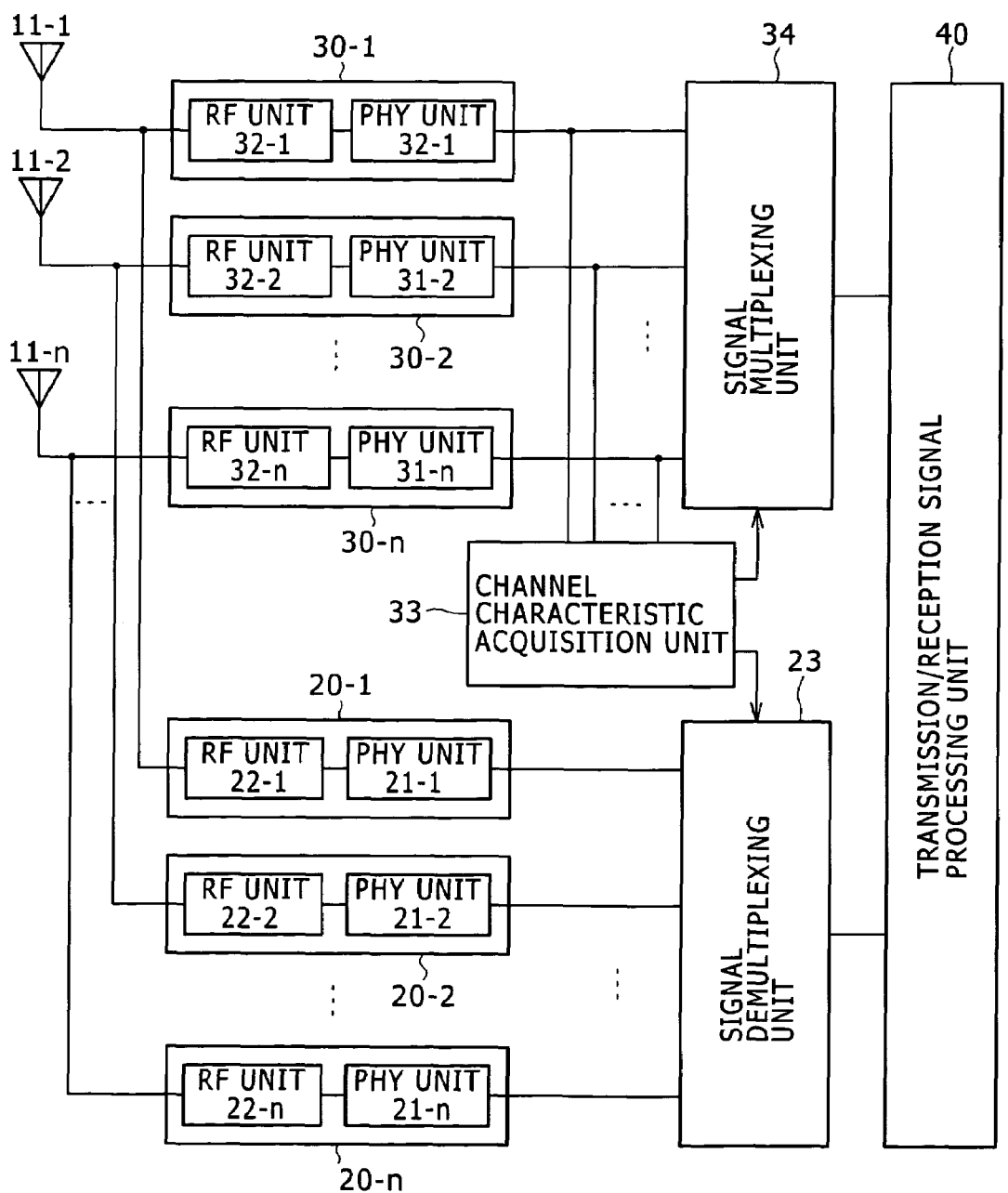
FIG. 1 is a diagram schematically showing the configuration of a wireless communication apparatus according to an embodiment of the present invention.

FIG. 1 schematically shows the configuration of a wireless communication apparatus according to an embodiment of the present invention.

In the example shown in FIG. 1, the wireless communication apparatus is provided with n antennas 11-1, 11-2, ..., 11-n. Further, the wireless communication apparatus is provided with n transmission branches 20-1, 20-2, ..., 20-n and n reception branches 30-1, 30-2, ..., 30-n which are provided for each antenna. The antennas 11-1, 11-2, ..., 11-n transmit signals to other wireless communication apparatuses by wireless using spatially multiplexed channels, or acquire signals from other wireless communication apparatuses through spatially multiplexed channels. The respective transmission branches 20 and reception branches 30 that correspond to each other are connected to the respective antennas 11 through antenna switches (not shown); therefore, transmission and reception cannot be performed simultaneously.

The transmission branch 20 is provided with a PHY unit 21 including a modulator for modulating a transmission signal by a specified modulation scheme and a D/A converter for converting a digital transmission signal into an analog signal; and an RF unit 22 including an up-converter for upconverting the analog transmission signal by frequency conversion and a power amplifier (PA) for amplifying the electric power of the upconverted transmission signal.

The reception branch 30 is provided with an RF unit 32 including a low-noise amplifier (LNA) for amplifying the voltage of a signal received from another station through the antenna 11, a down-converter for downconverting the amplified reception signal by frequency conversion, and an automatic gain controller (AGC); and a PHY unit 31 including an A/D converter for converting an analog transmission signal into a digital signal, processing for synchronization, channel estimation, and a demodulator for performing demodulation processing by a specified demodulation scheme (each of them is not shown).

A channel characteristic acquisition unit 33 acquires a channel matrix H using a reference signal sent from the communication apparatus at the other end. In the case of adopting a closed-loop type such as SVD-MIMO as the MIMO communication scheme, the channel characteristic acquisition unit 33 obtains a transmission weight matrix V, a reception weight matrix UH, and a diagonal matrix D by further performing singular value decomposition on the channel matrix H. In the case where the communication apparatus at the other end transmits reference signals at specified intervals, the channel characteristic acquisition unit 33 updates a channel matrix H each time and performs singular value decomposition on it.

A signal multiplexing unit 34 performs weighted multiplexing on reception signals at the respective reception branches 30-1, 30-2, ..., 30-n using reception weights of the respective reception branches 30-1, 30-2, ..., 30-n which are obtained based on the channel matrix H acquired by the channel characteristic acquisition unit 33. In the SVD-MIMO scheme, a reception weight matrix $U^H$ obtained by performing singular value decomposition on the channel matrix H is set in the signal multiplexing unit 34. The multiplexed reception signal is processed by a transmission/reception signal processing unit 40.

Further, transmission data outputted from the transmission/reception signal processing unit 40 is demultiplexed into transmission signals on the respective transmission branches 20-1, 20-2, ..., 20-n at a signal demultiplexing unit 23. In the case of adopting a closed-loop MIMO communication scheme, transmission weights are applied to the respective transmission signals on the respective transmission branches 20-1, 20-2, ..., 20-n. For example, in the case of adopting the SVD-MIMO scheme, the communication apparatus at the other end transmits feedback of a transmission weight matrix V which results from performing singular value decomposition on the channel matrix H obtained by the channel characteristic acquisition unit 33, and the transmission weight matrix V is employed as transmission weights.

According to the MIMO communication scheme, if the communication apparatus at the other end is provided with a plurality of transmit/receive antennas in the same way, multiple spatially multiplexed channels, i.e., MIMO channels can be obtained. In this case, the number of spatially multiplexed channels to be formed corresponds to, at the maximum (i.e., ideally), either the number of transmission branches at a transmitter or the number of reception branches at a receiver, whichever is smaller. Therefore, in the case where the wireless communication apparatus shown in FIG. 1 operates as a receiver, the number of spatially multiplexed channels k is equal to or smaller than the number of possessed reception branches n.

In a wireless communication apparatus of the MIMO transmission scheme, since the apparatus operates to communicate using a plurality of branches, there is a problem that the power consumption increases in rough proportion to the number of branches used. For example, a receiver goes on reception standby where the receiver spends most of the time on packet detection. If a plurality of reception branches go on reception standby during this period as well, the wasted power becomes excessive.

The wireless communication apparatus according to this embodiment is provided with a communication control unit for control of enabling and disabling the respective reception branches 30-1, 30-2, ..., 30-n in accordance with a reception operating state. The communication control unit is not shown in FIG. 1 to avoid complication of the drawing.

The communication control unit performs packet detection using a part of the plurality of reception branches 30-1, 30-2, ..., 30-n in a reception standby state and disables the reception operation of the remaining reception branches that do not perform packet detection, thereby reducing the power consumption during packet detection standby.

Further, in the MIMO transmission scheme, there is formed the number of spatially multiplexed channels that corresponds to, at the maximum (i.e., ideally), either the number of transmission branches at a transmitter or the number of reception branches at a receiver, whichever is smaller. Therefore, the receiver does not always require all reception branches. Consequently, in a packet reception state, the communication control unit enables only the minimum necessary number of reception branches for receiving a signal that is spatially multiplexed by MIMO transmission, thereby reducing the power consumption also during reception of MIMO signals.

Figure 2:
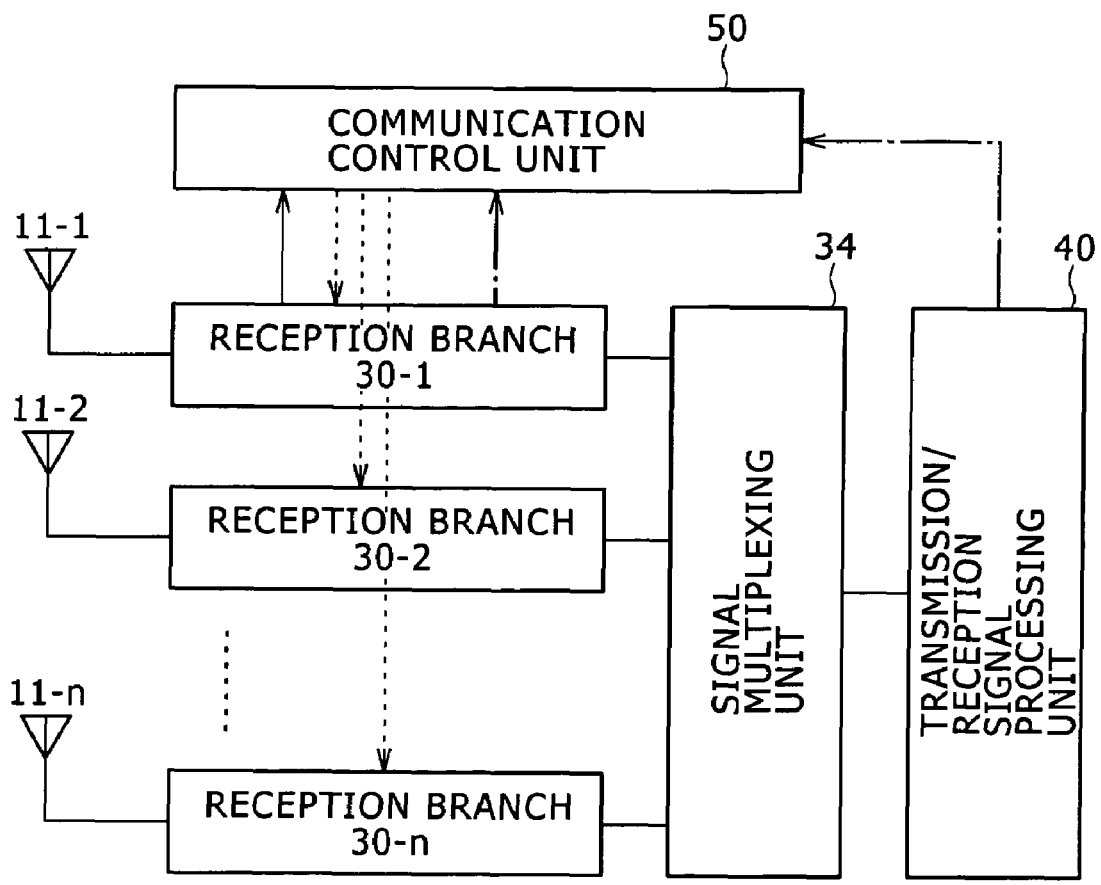
FIG. 2 is a diagram schematically showing the function configuration in which a communication control unit controls the operation of each reception branch.

FIG. 2 schematically shows the function configuration in which a communication control unit 50 controls the operation of reception branches 30-1, 30-2, ..., 30-n.

The communication control unit 50 outputs enable/disable control signals for enabling and disabling the communication operation of the respective reception branches 30-1, 30-2, 30-n, and receives reception quality measurement signals inputted from the respective reception branches 30-1, 30-2, 30-n.

Further, the communication control unit 50 is supplied with analytical results of received a packet from the transmission/reception signal processing unit 40 or the reception branch 30-1. In the case of a format by which the number of spatially multiplexed channels to be received is described in a PHY header, the number of spatially multiplexed channels to be received that is obtained by demodulating and decoding the PHY header is sent to the communication control unit 50 from the reception branch 30-1.

In the example of FIG. 2, a single reception branch 30-1 is assigned as a branch for use in packet detection. The reception branch 30-1 inputs a packet detection signal to the communication control unit 50.

In a reception standby state where a packet is detected, the communication control unit 50 disables the communication operation of the respective reception branches 30-2, ..., 30-n that do not perform packet detection.

Upon receiving a packet detection signal from the reception branch 30-1, the communication control unit 50 enables the communication operation of the remaining reception branches 30-2, ..., 30-n. Consequently, the wireless communication apparatus can receive a spatially multiplexed signal.

The transmission/reception signal processing unit 40 analyzes a packet received through spatially multiplexed channels and, for example, checks the destination address of the packet at a MAC header section. If the packet is addressed to this station or the group including this station, the communication control unit 50 keeps enabling the reception branches 30-2, ..., 30-n in order to continue receiving the packet.

On the other hand, if the packet is not addressed to this station or the group including this station, the communication control unit 50 disables the communication operation of the reception branches 30-2, ..., 30-n and transitions to a reception standby state or a packet detection state where only the reception branch 30-1 performs packet detection.

In the case of receiving the packet addressed to this station or the group including this station, the PHY unit in the reception branch 30-1 or the transmission/reception signal processing unit 40 analyzes the packet received through spatially multiplexed channels and obtains the number of reception branches k needed for packet reception processing. For example, the PHY unit can obtain the number of reception branches k needed for packet reception processing based on a MIMO training sequence or the description of a PHY header in the packet.

The maximum (i.e., ideal) number of spatially multiplexed channels k corresponds to either the number of transmission branches at a transmitter or the number of reception branches at a receiver, whichever is smaller. Therefore, in the case where the necessary number of reception branches k falls below the number of owned branches n, the communication control unit 50 disables only the unnecessary number of branches (n-k) for the communication operation. Based on reception quality information obtained from the respective reception branches 30-2, . . . , 30-n, it is possible to select unnecessary reception branches in increasing order of reception quality for the number of these branches (n-k).

FIG. 3 shows an example of a packet format applied to the MIMO transmission scheme. In FIG. 3, the contents are successively transmitted in order from left to right.

There is placed a training sequence that can be received by one reception branch, in the first place. Next, there are successively placed a PHY header, a Re-AGC-purpose MIMO training sequence that is transmitted simultaneously from a plurality of spatially multiplexed channels, and a MIMO training sequence for each spatially multiplexed channel in a time-division manner. Since the number of spatially multiplexed channels is 3 in the example shown in FIG. 3, one MIMO training sequence from each spatially multiplexed channel, namely, 3 MIMO training sequences in total are transmitted. Subsequently, there is placed a MIMO payload that is spatially multiplexed using a MIMO technology. Assume that a nearly head section in the MIMO payload in terms of time (namely, a MAC header) describes at least a destination address of the packet.

The Re-AGC-purpose MIMO training sequence that is placed between the PHY header and the MIMO training is not essential to realize the present invention, but is very effective to optimize characteristics.

In the example shown in FIG. 3, the packet format is structured in view of IEEE802.11; therefore, the destination address of the packet is described in the MAC header which is the head section of the MIMO payload. However, the gist of the present invention is not limited to this. For example, the destination address may be described in the PHY header. In this case, since the PHY header is transmitted at such a low speed that all communication stations can perform reception processing, the addition of a field for just an 8-byte address renders the PHY header larger so that time overhead increases. On the other hand, the communication station can determine whether the packet is addressed to this station or not immediately after the packet detection. Therefore, there is an advantage that the communication station can go into a low power consumption state immediately if the packet is not addressed to this station.

Further, as an example of the MIMO training sequence, FIG. 3 shows that a sequence of one spatially multiplexed MIMO channel is transmitted in a time-division manner. However, the gist of the present invention is not limited to this structure. For example, in the case of a system using an OFDM modulation, as shown in FIG. 4, there may be employed a so-called subcarrier-interleaved and time-divided MIMO training sequence in which MIMO training sequences are transmitted simultaneously from a plurality of spatially multiplexed channels at some point in time, whereas only one spatially multiplexed channel is transmitted from the viewpoint of a specific subcarrier. In the example shown in FIG. 4, since the number of spatially multiplexed channels is 3, a MIMO training sequence is composed of 3 (or an integral multiple of 3) OFDM symbols in terms of time.

The reception operation at the time of receiving a signal in the above-mentioned packet format will be described below.

The training sequence and the PHY header are transmitted through only one spatially multiplexed channel, and a receiver can receive these with at least one reception branch. At the time of receiving a packet, a communication apparatus first detects a known training sequence by packet detection processing. The communication apparatus further performs elimination of frequency offset and timing offset, propagation channel estimation, and reception AGC operation, using the training sequence. After these processes, the communication apparatus can receive a PHY header.

In the PHY header, there are used a modulation scheme, an error correction scheme, an encoding rate, and the like which are predetermined in a communication system. The communication apparatus can receive without knowledge (i.e., without knowledge acquisition procedure such as negotiations with a communication apparatus at the other end). The PHY header generally includes bits that indicate a modulation scheme, an error correction scheme, an encoding rate, total data length, the number of spatially multiplexed channels, and the like which are necessary to demodulate and decode the latter half section of the packet, namely, the MIMO payload.

However, depending on system design, there are cases where the number of spatially multiplexed channels is not included in the PHY header as described later. Therefore, in this specification, there is provided another embodiment in which the number of spatially multiplexed channels is not included in the PHY header.

After receiving the PHY header, the communication apparatus receives a Re-AGC-purpose MIMO training sequence, with all reception branches enabled. M branches that have been enabled from the beginning perform re-AGC operation, and (n-m) branches that have started the operation newly perform AGC operation. After the completion of AGC, all reception branches receive known MIMO training sequences. A plurality of reception branches receive a plurality of MIMO training sequences corresponding to a plurality of spatially multiplexed channels. In this manner, the communication apparatus can obtain a propagation channel matrix H and separate the spatially multiplexed MIMO payload in a later section using the propagation channel matrix H.

A first embodiment of the present invention will be described with reference to FIG. 5. In the example shown in FIG. 5, the number of spatially multiplexed channels to be transmitted is 3, and the number of reception branches of a wireless communication apparatus that performs MIMO reception n is also 3.

The wireless communication apparatus that receives a MIMO packet has 3 reception branches 1-3, but uses only the reception branch 1 to perform packet detection in a packet detection mode. In the case where a packet has actually been detected, the reception branch 1 informs the communication control unit 50 of the packet detection. The communication control unit 50 receives this information and instructs the reception branches 2 and 3 in a disabled state to activate and get ready to receive a re-AGC-purpose MIMO training signal.

The reception branch 1 outputs a packet detection signal and transitions to a reception mode. Further, the reception branch 1 receives a PHY header and outputs a start timing of a Re-AGC-purpose MIMO training sequence to the communication control unit 50. The communication control unit 50 receives this information and sends the timing of the Re-AGC-purpose MIMO training sequence to the reception branches 2-3. The reception branches 1-3 receive the Re-AGC-purpose MIMO training sequence using this timing and start AGC operation.

After the completion of AGC, the reception branch 1 outputs a start timing of a MIMO training sequence to the communication control unit 50. The communication control unit 50 instructs the other reception branches 2-3 to receive the MIMO training sequence with this timing, and all reception branches receive the MIMO training sequence.

In the example shown in FIG. 5, upon detecting a packet, the reception branch 1 outputs an enable signal to the other reception branches 2-3. However, the gist of the present invention is not limited to this. Since the respective reception branches 1-3 may start the reception operation correctly before starting to receive the Re-AGC-purpose MIMO training sequence, timing with which the enable signal is provided to the respective branches may be set, in consideration of a required starting time, a latency from the RF unit 32 composed of analog circuits to the PHY unit 31 composed of digital circuits, a latency until ADC starts the operation correctly, and the like.

In a reception system of a wireless communication apparatus, a MIMO payload section is demodulated and decoded with a propagation channel matrix obtained by receiving a MIMO training sequence. At this time, the transmission/reception signal processing unit 40 which corresponds to a MAC layer checks a destination address in a MAC header affixed to the approximate head of a MAC payload. If the packet is addressed to this station or the group including this station, the transmission/reception signal processing unit 40 instructs the communication control unit 50 to allow all reception branches 1-3 to continue receiving, so that n reception branches continue receiving for a length specified by the PHY header. At the completion of packet reception, the communication control unit 50 changes only the reception branch 1 to a packet detection standby mode and returns the other reception branches to a disable state.

The transmission/reception signal processing unit 40 checks a destination address in the MAC header affixed to the approximate head of the MAC payload. If the packet is not addressed to this station or the group including this station, the communication control unit 50 changes only the reception branch 1 to the packet detection standby mode and returns the other reception branches to the disable state, from the MAC header onward.

FIG. 6 shows the operation in the latter case. As shown in FIG. 6, the transmission/reception signal processing unit 40 informs the communication control unit 50 that it is not necessary to continue receiving the packet any longer. Upon receiving this information, the communication control unit 50 changes only the reception branch 1 to the packet detection standby mode and returns the other reception branches to the disable state. Since it is obvious that the packet not addressed to this station (i.e., no need for reception processing) continues for the length specified by the PHY header, it is possible to bring about lower power consumption when the communication control unit 50 disables one reception branch in the packet detection standby mode as well as the other reception branches so that the reception branch does not perform packet detection during the continuation time of the packet.

Figure 7:
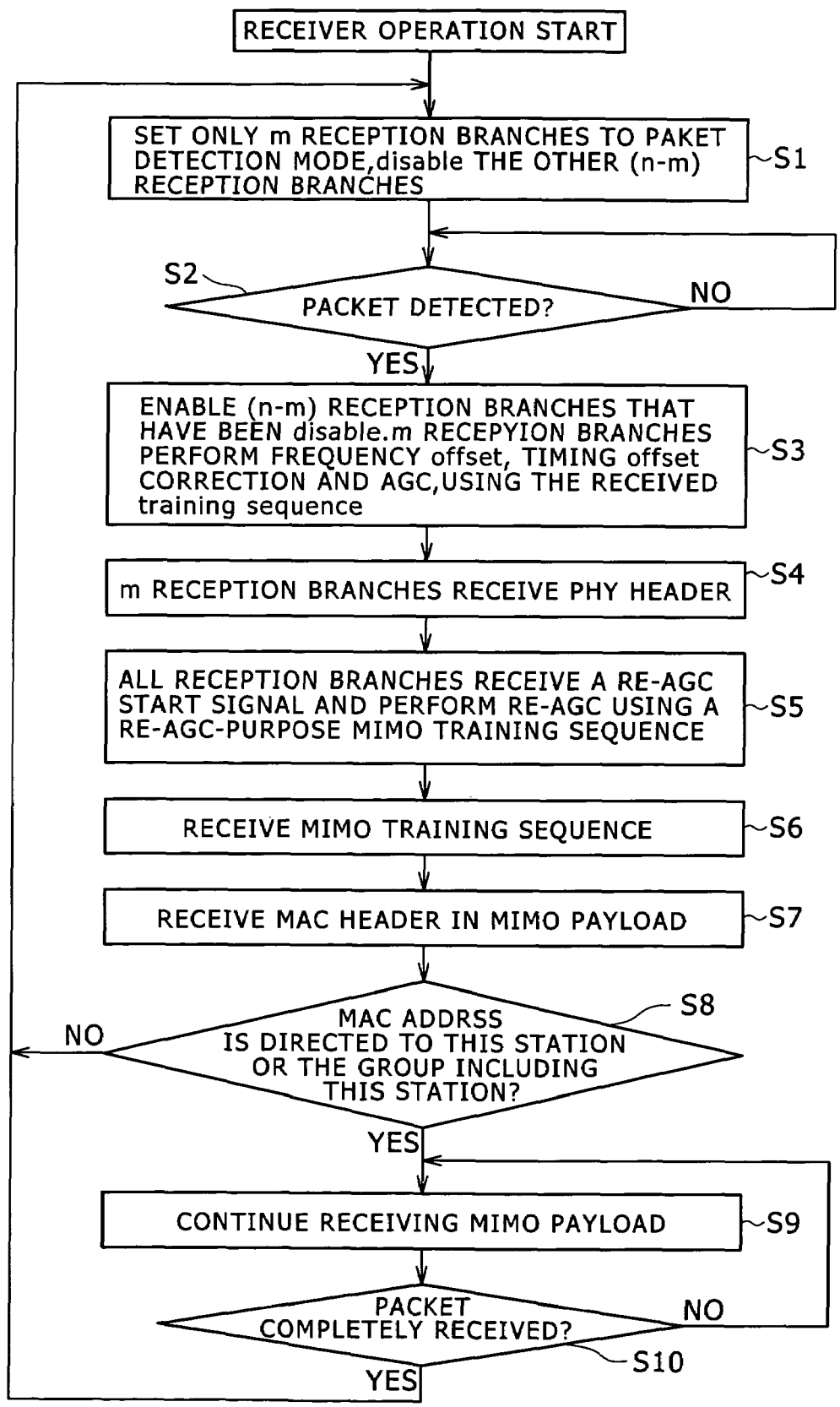
FIG. 7 is a flowchart showing the process of packet reception operation of a wireless communication apparatus according to the first embodiment of the invention.

FIG. 7 is a flowchart showing the process of packet reception operation of the wireless communication apparatus according to the first embodiment.

The wireless communication apparatus is on standby for a packet, in a packet detection mode (step S1). In the packet detection mode, the apparatus uses only a part of the reception branches to receive a packet, and disables the reception operation of the other reception branches.

Assume that the number of transmission/reception branches that the wireless communication apparatus has is n and the number of reception branches for detecting a packet is m (m<n). In this case, (n-m) reception branches are disabled for the reception operation in the packet detection mode, thereby producing an effect of the lower power consumption.

If the apparatus detects a packet in the packet detection mode (step S2), the apparatus transitions to a packet reception mode and enables (n-m) reception branches that have been disabled for the reception operation (step S3).

At this time, m reception branches that have been performing the reception operation even in the packet detection mode perform frequency offset, timing offset correction, AGC operation, etc. using the received training sequence.

Next, m reception branches receive a PHY header of the packet (step S4).

Next, all reception branches receive a re-AGC start signal and perform re-AGC using a Re-AGC-purpose MIMO training sequence (step S5).

Next, the apparatus receives a MIMO training sequence (step S6).

Next, the apparatus receives a MAC header in a MIMO payload (step S7). The apparatus checks a MAC address described in the MAC header and determines whether the packet is addressed to this station or the group including this station (step S8).

If the packet is not addressed to this station or the group including this station, the process returns to S1. That is, the apparatus returns to the packet detection mode where the apparatus uses only a part of the reception branches to receive a packet and disables the reception operation of the other reception branches.

If the packet is addressed to this station or the group including this station, the apparatus continues receiving the MIMO payload, using all reception branches (step S9).

If the apparatus has received the packet completely (step S10), the process returns to S1. That is, the apparatus returns to the packet detection mode where the apparatus uses only a part of the reception branches to receive a packet and disables the reception operation of the other reception branches.

Next, a second embodiment of the present invention will be described with reference to FIG. 8. In the example shown in FIG. 8, the number of spatially multiplexed channels to be transmitted is 3, and the number of reception branches possessed by the wireless communication apparatus as a receiver in MIMO transmission n is 4. In this case, the maximum (i.e., ideal) number of spatially multiplexed channels k is 3, which is smaller than the number of reception branches n (=4).

The wireless communication apparatus that receives a MIMO packet has 4 reception branches 1-4, and uses only the reception branch 1 to perform packet detection in a packet detection mode. In the case where a packet has actually been detected, the reception branch 1 informs the communication control unit 50 of the packet detection. The communication control unit 50 receives this information and instructs the reception branches 2, 3, and 4 in a disabled state to activate and get ready to receive a re-AGC-purpose MIMO training signal.

The reception branch 1 outputs a packet detection signal and transitions to a reception mode. Further, the reception branch 1 receives a PHY header and outputs a start timing of a Re-AGC-purpose MIMO training sequence to the communication control unit 50. The communication control unit 50 receives this information and sends the timing of the Re-AGC-purpose MIMO training sequence to the reception branches 2-4. The reception branches 1-4 receive the Re-AGC-purpose MIMO training sequence using this timing and start AGC operation.

Figure 8:
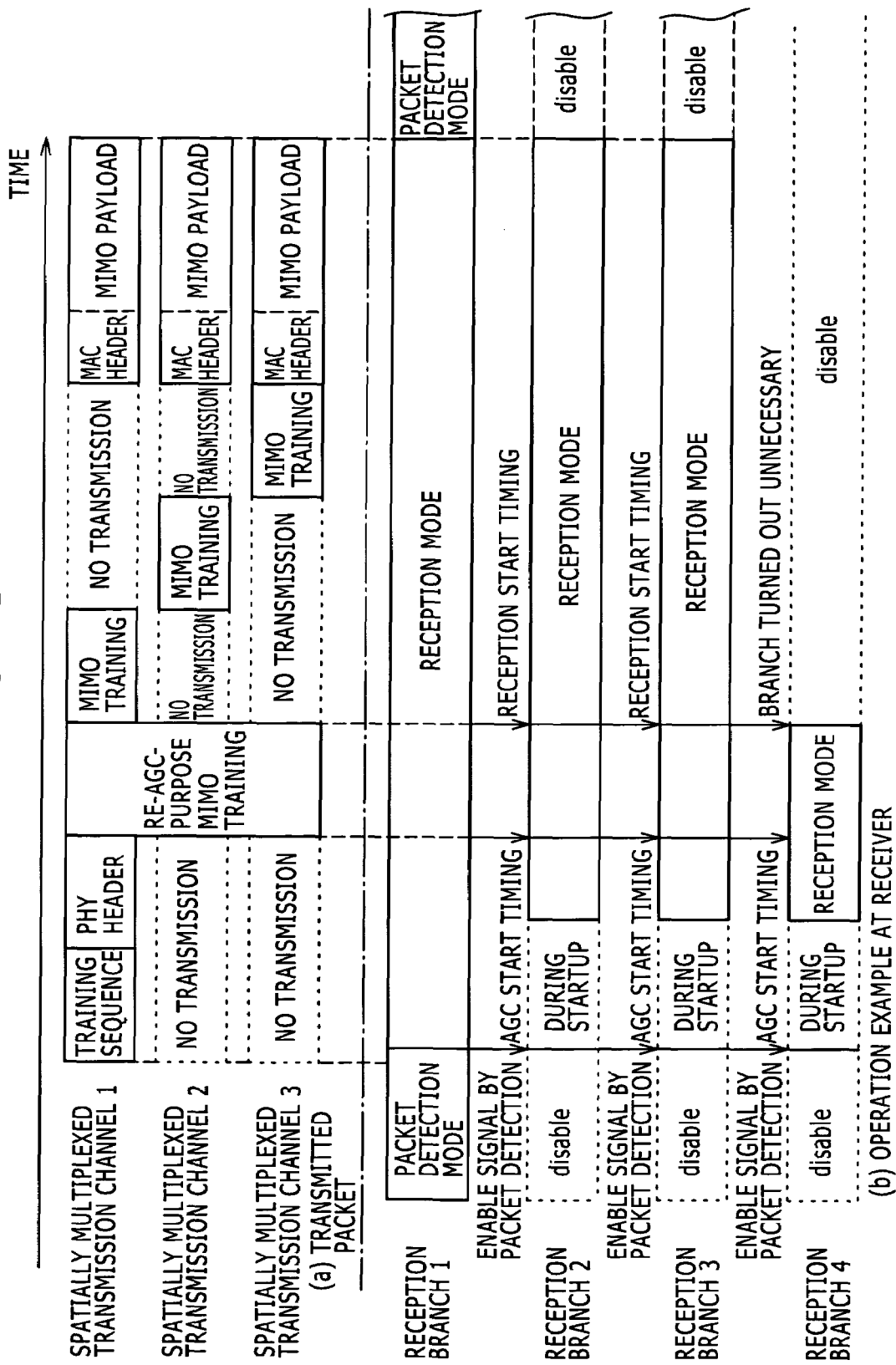
FIG. 8 is a diagram for explaining a second embodiment of the invention.

As for a start timing, in the example shown in FIG. 8, upon detecting a packet, the reception branch 1 outputs an enable signal to the other reception branches 2-4. However, it is possible to employ another method in the same way as in the first embodiment.

In the case of a format by which the number of spatially multiplexed channels to be received is described in a PHY header, the number of spatially multiplexed channels to be received that is obtained by demodulation and decoding is sent to the communication control unit 50 from the reception branch 1.

The communication control unit 50 compares the number of reception branches that are currently enabled and the number of spatially multiplexed channels to be received. If the number of reception branches is larger than the number of spatially multiplexed channels, the communication control unit 50 disables unnecessary reception branches within the limits where the number of reception branches is not smaller than the number of spatially multiplexed channels. In this embodiment, the number of MIMO reception branches possessed by the wireless communication apparatus n is 4, whereas the number of spatially multiplexed channels, namely, the necessary number of branches k is 3. Therefore, the communication control unit 50 instructs the reception branch 4 selected as an unnecessary branch to stop the reception operation and return to the disable mode.

In the example shown in FIG. 8, demodulating and decoding the PHY header is completed before all reception branches 1-4 completes AGC. After the start of AGC, a control signal for disabling the reception branch 4 is outputted before a reception start signal of a MIMO training sequence is outputted. However, the timing for disabling unnecessary reception branch is not limited to this. Depending on the latency of demodulation and decoding of a PHY header, a control signal for disabling the reception branch 4 may be outputted after the start of reception of a MIMO training sequence.

After the completion of AGC, the reception branch 1 outputs a start timing of a MIMO training sequence to the communication control unit 50. The communication control unit 50 instructs the reception branches 2-3 to receive the MIMO training sequence with this timing, and all reception branches 1-3 that are being enabled receive the MIMO training sequence.

Reception method from this point onward is the same as in the first embodiment of the present invention. If a destination address described in a MAC header is directed to this station or the group including this station, three reception branches 1-3 continue receiving. If the packet is not addressed to this station or the group including this station, the communication control unit 50 disables two reception branches 2-3 and allows only the reception branch 1 to go into a packet standby mode upon determining that the MAC address is different, in the same way as in the operation example shown in FIG. 6.

Figure 9:
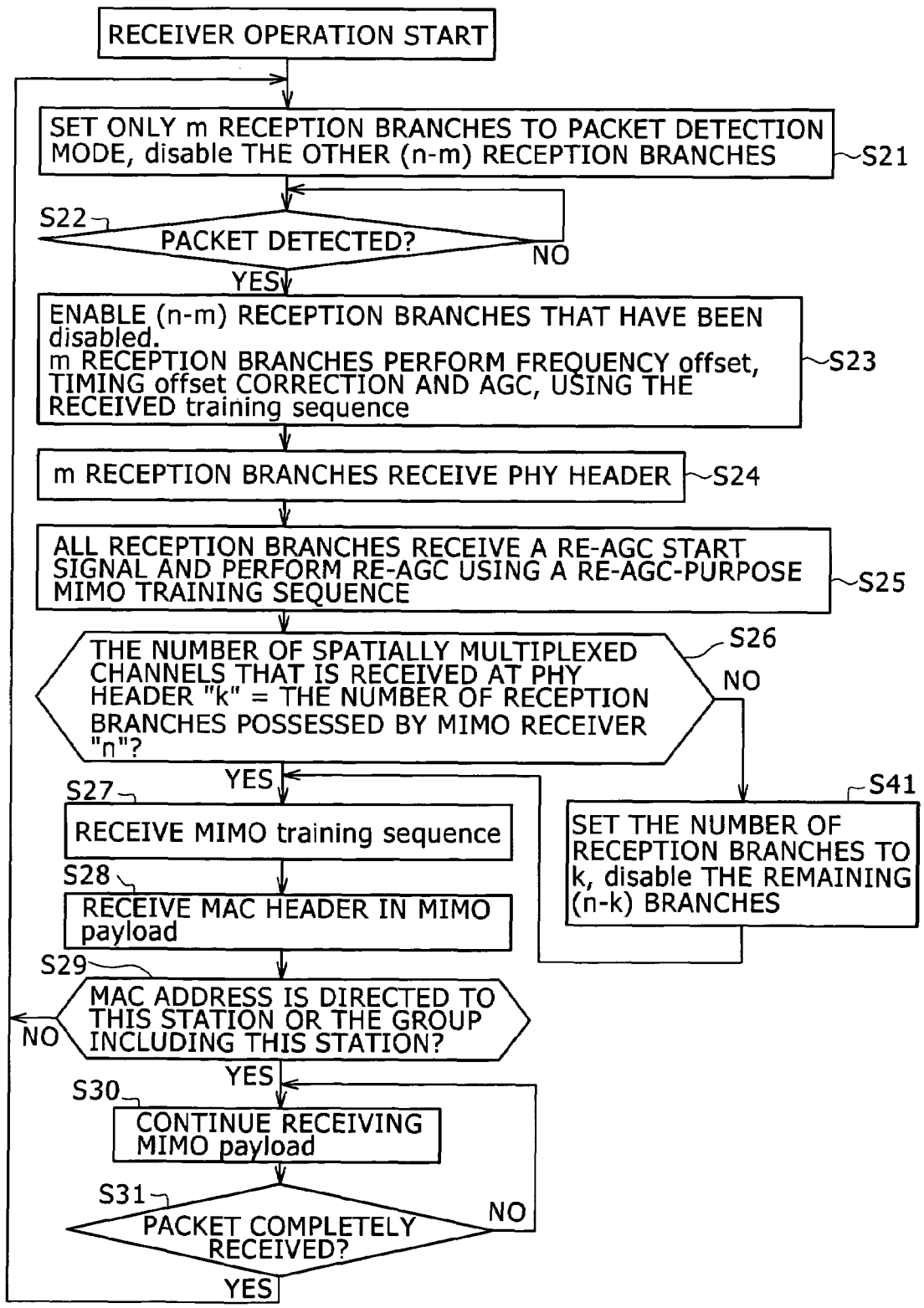
FIG. 9 is a flowchart showing the process of packet reception operation of a wireless communication apparatus according to the second embodiment of the invention.

FIG. 9 is a flowchart showing the process of packet reception operation of the wireless communication apparatus according to the second embodiment.

The wireless communication apparatus is on standby for a packet, in a packet detection mode (step S21). In the packet detection mode, the apparatus uses only a part of the reception branches to receive a packet, and disables the reception operation of the other reception branches.

Assume that the number of transmission/reception branches that the wireless communication apparatus has is n and the number of reception branches for detecting a packet is m (m<n). In this case, (n-m) reception branches are disabled for the reception operation in the packet detection mode, thereby producing an effect of the lower power consumption.

If the apparatus detects a packet in the packet detection mode (step S22), the apparatus transitions to a packet reception mode and enables (n-m) reception branches that have been disabled for the reception operation (step S23).

At this time, m reception branches that have been performing the reception operation even in the packet detection mode perform frequency offset, timing offset correction, AGC operation, etc. using the received training sequence.

Next, m reception branches receive a PHY header of the packet (step S24).

Next, all reception branches receive a re-AGC start signal and perform re-AGC using a Re-AGC-purpose MIMO training sequence (step S25).

Next, the apparatus compares the number of spatially multiplexed channels described in the PHY header, namely, the necessary number of reception branches k and the number of reception branches possessed by the wireless communication apparatus n (step S26). Assume that the number of spatially multiplexed channels k is received at the PHY header of the packet.

If the necessary number of reception branches k is smaller than the number of reception branches possessed by the wireless communication apparatus n, the communication control unit 50 sets the number of reception branches for performing the reception operation to k and disables the remaining (n-k) reception branches (step S41). That is, the unnecessary reception branches are disabled for the reception operation, thereby producing an effect of the lower power consumption.

Next, the apparatus receives a MIMO training sequence (step S27).

Next, the apparatus receives a MAC header in a MIMO payload (step S28). The apparatus checks a MAC address described in the MAC header and determines whether the packet is addressed to this station or the group including this station (step S29).

If the packet is not addressed to this station or the group including this station, the process returns to S21. That is, the apparatus returns to the packet detection mode where the apparatus uses only a part of the reception branches to receive a packet and disables the reception operation of the other reception branches.

If the packet is addressed to this station or the group including this station, the apparatus continues receiving the MIMO payload, using all reception branches (step S30).

If the apparatus has received the packet completely (step S31), the process returns to S21. That is, the apparatus returns to the packet detection mode where the apparatus uses only a part of the reception branches to receive a packet and disables the reception operation of the other reception branches.

As described, in the operation sequence shown in FIG. 8, the apparatus immediately disables the reception branch 4 that is determined to be unnecessary in comparison with the number of spatially multiplexed channels, as a result of decoding the PHY header. In the above description, it has not been described how to determine an unnecessary reception branch.

For example, in view of reception quality of all reception branches that the wireless communication apparatus has, unnecessary reception branches can be selected in increasing order of reception quality of the detected packet. In this case, the communication control unit 50 allows k branches out of n that receive the packet with better quality to continue the reception operation and disables the remaining (n-k) branches.

As possible quality information, there are full electric power for reception, amplitude flatness of a subcarrier after FFT, a size of a determinant or a rank of a channel matrix estimated from a variety of combinations of reception branches, and the like.

Figure 10:
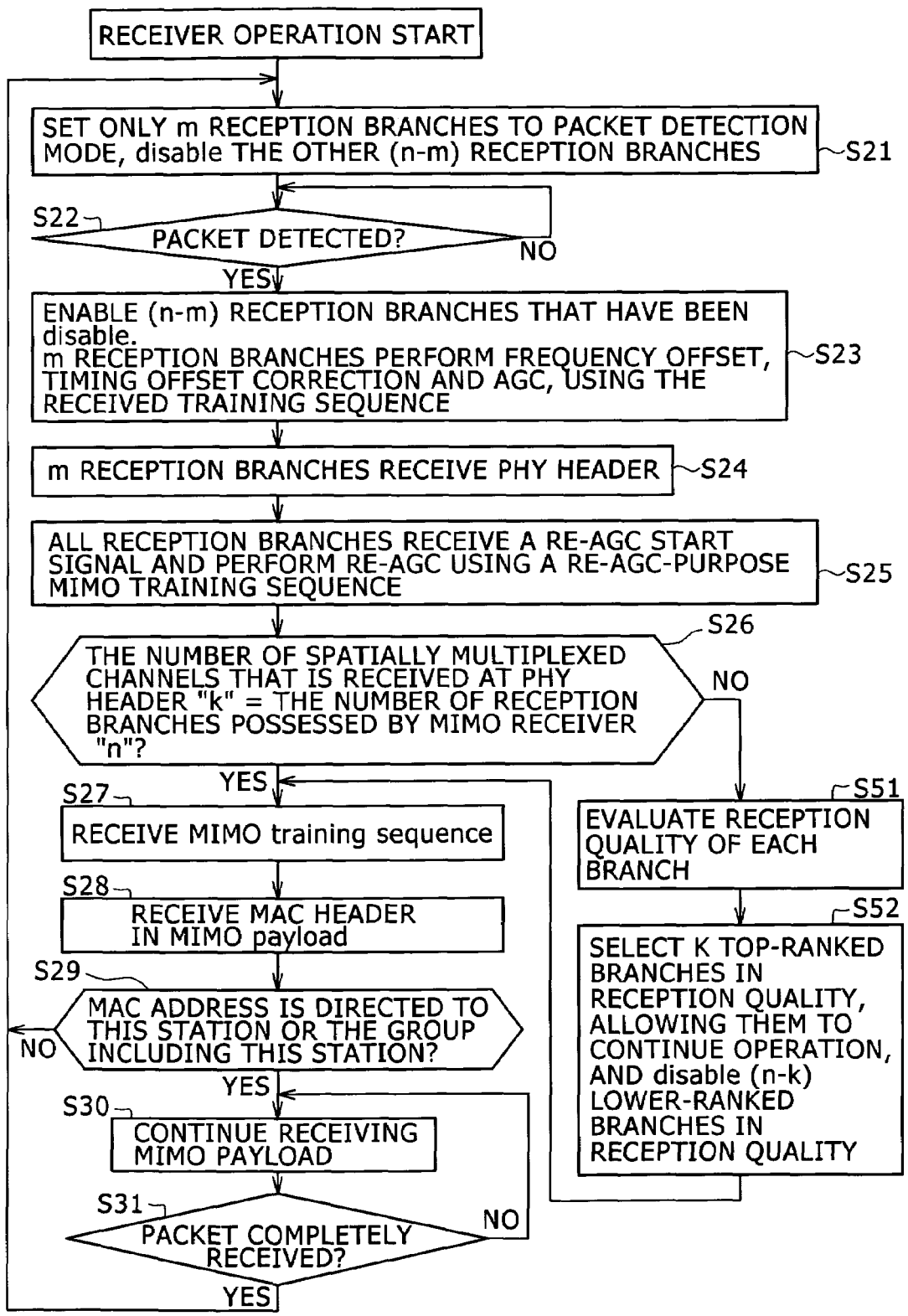
FIG. 10 is a flowchart showing the process of packet reception operation of a wireless communication apparatus in the case of including the process for determining an unnecessary reception branch.

FIG. 10 is a flowchart showing the process of packet reception operation of the wireless communication apparatus in the case of including the process for determining an unnecessary reception branch. In this operation process, there is added a step for selecting a reception branch to be used in the case where there are (n-k) reception branches that are surplus to the number of spatially multiplexed channels k, in the flowchart shown in FIG. 9.

The apparatus compares the number of spatially multiplexed channels, namely, the necessary number of reception branches k and the number of reception branches possessed by the wireless communication apparatus n (step S26). If the necessary number of reception branches k is smaller than the number of reception branches possessed by the wireless communication apparatus n, the communication control unit 50 first evaluates the reception quality of each reception branch (step S51). The communication control unit 50 selects k top-ranked branches in reception quality, allowing them to continue the reception operation, and disables (n-k) lower-ranked branches in reception quality (step S52). The unnecessary reception branches are disabled for the reception operation, thereby producing an effect of the lower power consumption.

In the case of determining an unnecessary reception branch based on the reception quality of the detected packet, it is necessary in the operation sequence of packet reception to perform processing for obtaining the reception quality of all of the n reception branches.

FIG. 11 shows the operation sequence in this case. In the example shown in FIG. 11, even if it has turned out that there are (n-k) reception branches that are surplus to the number of spatially multiplexed channels k, the apparatus allows all n (=4) reception branches to continue receiving until the MIMO training sequence and obtains the reception quality information about the packet at the reception branches 1-4. As the quality information, there are full electric power for reception, amplitude flatness of a subcarrier after FFT, a size of a determinant or a rank of a channel matrix estimated from a variety of combinations of reception branches, and the like.

In the example shown in FIG. 11, n−k=1. The reception branch 4 of which reception quality is not good is determined to be unnecessary and is disabled for the reception operation after the MIMO training sequence so as not to receive a MIMO payload.

In the operation example shown in FIG. 8, the unnecessary (n-k) reception branches perform the reception operation only until the re-AGC-purpose MIMO training; whereas, in the operation example shown in FIG. 11, all reception branches perform the reception operation until the MIMO training sequence in a later stage. The former differs from the latter in this point. In the latter case, the continuation of the reception operation by an unnecessary reception branch lessens the effect of low power consumption. However, since better reception branches can receive the MIMO payload, the communication quality is improved.

Next, a third embodiment of the present invention will be described with reference to FIG. 12. In the example shown in FIG. 12, the number of spatially multiplexed channels to be transmitted is 3, and the number of reception branches possessed by the wireless communication apparatus as a receiver in MIMO transmission n is 4. In this case, the maximum (i.e., ideal) number of spatially multiplexed channels k is 3, which is smaller than the number of reception branches n (=4).

The second embodiment is based on the premise that the number of spatially multiplexed channels of the packet to be transmitted is described in the PHY header bits. On the other hand, in the third embodiment, there is provided another method for detecting the number of spatially multiplexed channels. For example, the packet format may be designed in such a way that the number of spatially multiplexed channels is indicated with the code sequences of MIMO training sequences, instead of describing the number of spatially multiplexed channels in the PHY header. More specifically, it is designed in such a way that the code sequences of MIMO training sequences vary with the number of spatially multiplexed channels. In this case, a receiver for receiving a packet is provided with a plurality of correlators corresponding to each code sequence. The receiver checks in parallel correlations with MIMO training sequences to be inputted, and can detect the number of spatially multiplexed channels corresponding to the MIMO training sequence that has the highest peak of the correlation value.

The wireless communication apparatus that receives a MIMO packet has 4 reception branches 1-4, and uses only the reception branch 1 to perform packet detection in a packet detection mode. In the case where a packet has actually been detected, the reception branch 1 informs the communication control unit 50 of the packet detection. The communication control unit 50 receives this information and instructs the reception branches 2, 3, and 4 in a disabled state to activate and get ready to receive a re-AGC purpose MIMO training signal.

The reception branch 1 outputs a packet detection signal and transitions to a reception mode. Further, the reception branch 1 receives a PHY header and outputs a start timing of a Re-AGC-purpose MIMO training sequence to the communication control unit 50. The communication control unit 50 receives this information and sends the timing of the Re-AGC-purpose MIMO training sequence to the reception branches 2-4. The reception branches 1-4 receive the Re-AGC-purpose MIMO training sequence using this timing and start AGC operation.

As for a start timing, in the example shown in FIG. 12, upon detecting a packet, the reception branch 1 outputs an enable signal to the other reception branches 2-4. However, it is possible to employ another method in the same way as in the first and second embodiments.

After the completion of AGC, the reception branch 1 outputs a start timing of a MIMO training sequence to the communication control unit 50. The communication control unit 50 instructs the reception branches 2-4 to receive the MIMO training sequence with this timing, and all reception branches 1-4 receive the MIMO training sequence. In this embodiment, since the code sequences of MIMO training sequences indicates the number of spatially multiplexed channels, it is necessary for all reception branches to receive the MIMO training sequence, differing from the second embodiment (see FIG. 8).

The code sequences of MIMO training sequences vary with the number of spatially multiplexed channels. The MIMO training sequences that the reception branches 1-4 have received are inputted into a detector for detecting the number of spatially multiplexed channels that has a plurality of correlators corresponding to each code sequence (see FIG. 13). The communication apparatus checks in parallel correlations with MIMO training sequences to be inputted, and can detect the number of spatially multiplexed channels corresponding to the MIMO training sequence that has the highest peak of the correlation value. The obtained number of spatially multiplexed channels is inputted into the communication control unit 50.

The communication control unit 50 compares the number of reception branches currently enabled m and the number of spatially multiplexed channels to be received k. If the number of reception branches m is larger than the number of spatially multiplexed channels k, the communication control unit 50 disables (m-k) unnecessary reception branches within the limits where at least the number of reception branches m is not smaller than the number of spatially multiplexed channels k. In this embodiment, the number of MIMO reception branches n is 4, whereas the number of spatially multiplexed channels, namely, the necessary number of branches k is 3. Therefore, the communication control unit 50 instructs the reception branch 4 to stop the reception operation and return to the disable mode.

Reception method from this point onward is the same as in the first embodiment of the present invention. If a destination address described in a MAC header is directed to this station or the group including this station, three reception branches 1-3 continue receiving. If the packet is not addressed to this station or the group including this station, the communication control unit 50 disables two reception branches 2-3 and allows only the reception branch 1 to go into a packet standby mode upon determining that the MAC address is different, in the same way as in the operation example shown in FIG. 6.

Figure 14:
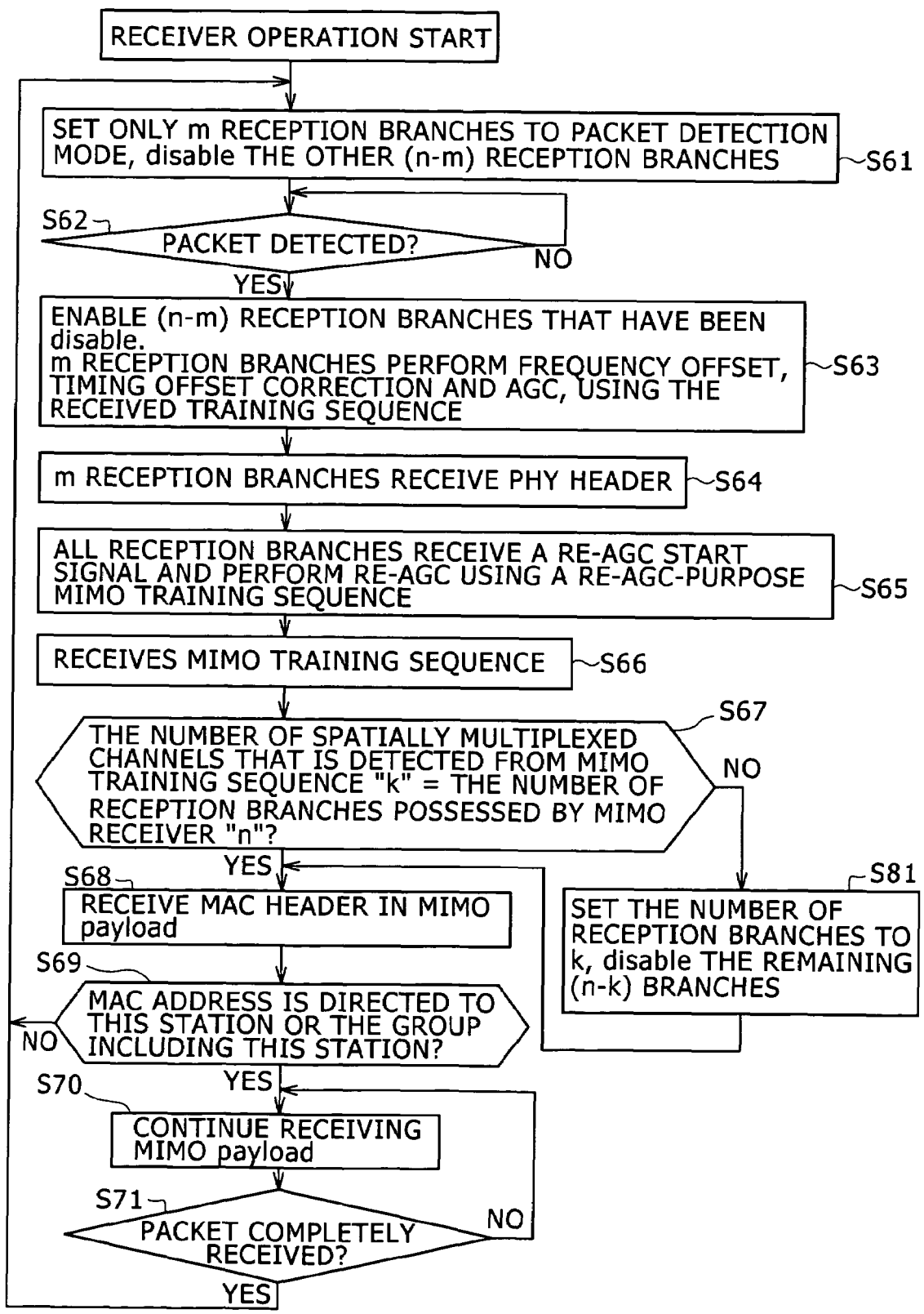
FIG. 14 is a flowchart showing the process of packet reception operation of a wireless communication apparatus according to the third embodiment of the invention.

FIG. 14 is a flowchart showing the process of packet reception operation of the wireless communication apparatus according to the third embodiment.

The wireless communication apparatus is on standby for a packet, in a packet detection mode (step S61). In the packet detection mode, the apparatus uses only a part of the reception branches to receive a packet, and disables the reception operation of the other reception branches.

Assume that the number of transmission/reception branches that the wireless communication apparatus has is n and the number of reception branches for detecting a packet is m (m<n). In this case, (n-m) reception branches are disabled for the reception operation in the packet detection mode, thereby producing an effect of the lower power consumption.

If the apparatus detects a packet in the packet detection mode (step S62), the apparatus transitions to a packet reception mode and enables (n-m) reception branches that have been disabled for the reception operation (step S63).

At this time, m reception branches that have been performing the reception operation even in the packet detection mode perform frequency offset, timing offset correction, AGC operation, etc. using the received training sequence.

Next, m reception branches receive a PHY header of the packet (step S64).

Next, all reception branches receive a re-AGC start signal and perform re-AGC using a Re-AGC-purpose MIMO training sequence (step S65).

Next, the apparatus receives a MIMO training sequence (step S66).

Next, the apparatus compares the number of spatially multiplexed channels detected from the MIMO training sequence, namely, the necessary number of reception branches k and the number of reception branches possessed by the wireless communication apparatus n (step S67). Assume that the number of spatially multiplexed channels k is received at the PHY header of the packet.

If the necessary number of reception branches k is smaller than the number of reception branches possessed by the wireless communication apparatus n, the communication control unit 50 sets the number of reception branches for performing the reception operation to k and disables the remaining (n-k) reception branches (step S81). That is, the unnecessary reception branches are disabled for the reception operation, thereby producing an effect of the lower power consumption.

Next, the apparatus receives a MAC header in a MIMO payload (step S68). The apparatus checks a MAC address described in the MAC header and determines whether the packet is addressed to this station or the group including this station (step S69).

If the packet is not addressed to this station or the group including this station, the process returns to S61. That is, the apparatus returns to the packet detection mode where the apparatus uses only a part of the reception branches to receive a packet and disables the reception operation of the other reception branches.

If the packet is addressed to this station or the group including this station, the apparatus continues receiving the MIMO payload, using all reception branches (step S70).

If the apparatus has received the packet completely (step S71), the process returns to S61. That is, the apparatus returns to the packet detection mode where the apparatus uses only a part of the reception branches to receive a packet and disables the reception operation of the other reception branches.

In the operation process shown in FIG. 14, the apparatus compares the number of spatially multiplexed channels, namely, the necessary number of reception branches k and the number of reception branches possessed by the wireless communication apparatus n, and disables the number of arbitrary reception branches that is determined to be unnecessary. In this example, all MIMO training sequences are received by all n reception branches. Further, a detector for detecting the number of spatially multiplexed channels that has a plurality of correlators corresponding to each code sequence (see FIG. 13) checks in parallel correlations with MIMO training sequences received by each reception branch, and can detect the number of spatially multiplexed channels corresponding to the MIMO training sequence that has the highest peak of the correlation value.

Further, at the time of disabling unnecessary reception branches, the reception quality of each reception branch may be taken into consideration. K branches having better quality out of n reception branches may continue receiving, and the remaining (n-k) branches may be disabled. As possible quality information, there are full electric power for reception, amplitude flatness of a subcarrier after FFT, a size of a determinant or a rank of a channel matrix estimated from a variety of combinations of reception branches, and the like.

Figure 15:
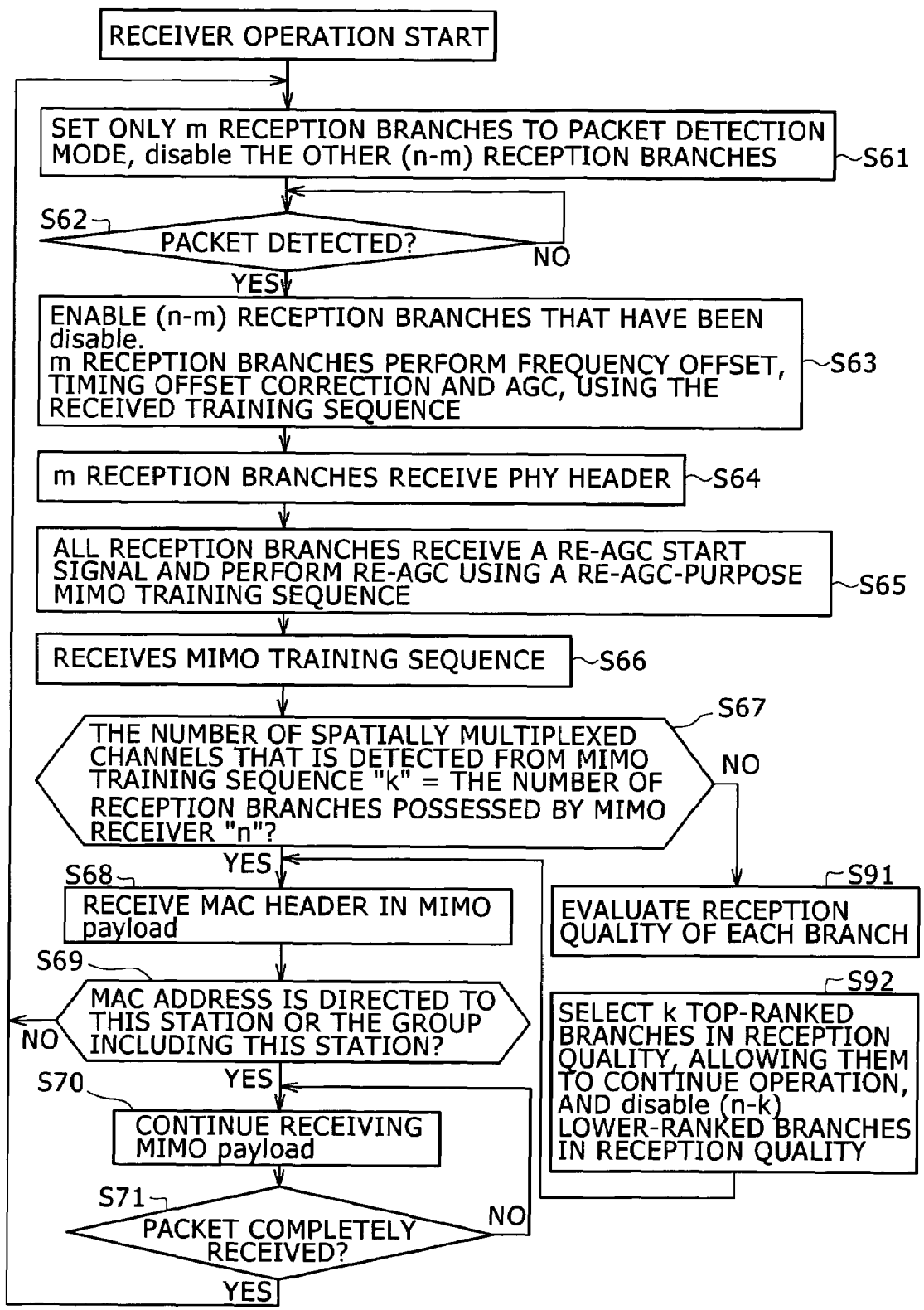
FIG. 15 is a flowchart showing the process of packet reception operation of a wireless communication apparatus in the case of including the process for determining an unnecessary reception branch.
Figure 16:
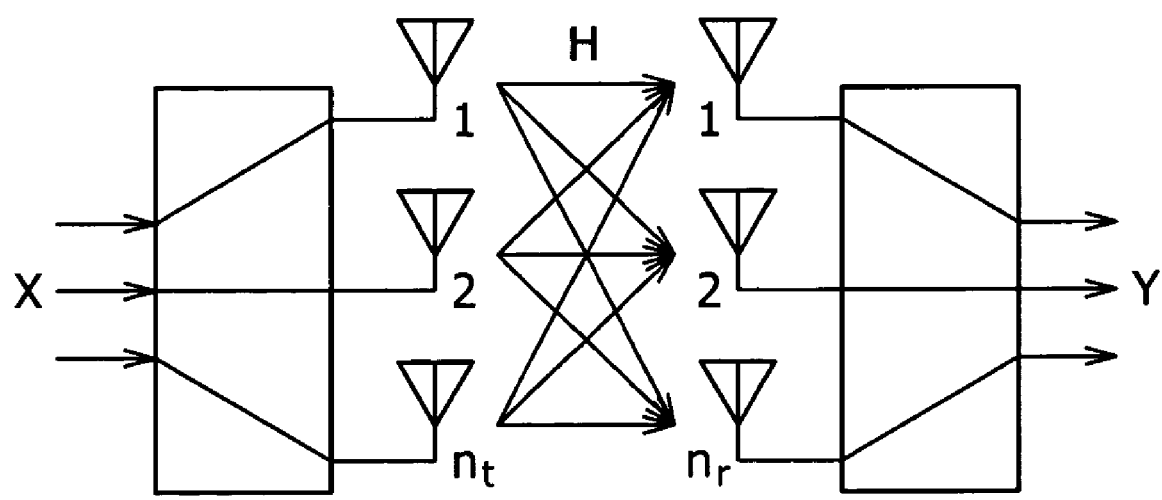
FIG. 16 is a diagram schematically showing the configuration of a MIMO communication system.

FIG. 15 is a flowchart showing the process of packet reception operation of the wireless communication apparatus in the case of including the process for determining an unnecessary reception branch. In this operation process, there is added a step for selecting a reception branch to be used in the case where there are (n-k) reception branches that are surplus to the number of spatially multiplexed channels k, in the flowchart shown in FIG. 14.

The apparatus compares the number of spatially multiplexed channels, namely, the necessary number of reception branches k and the number of reception branches possessed by the wireless communication apparatus n (step S67). If the necessary number of reception branches k is smaller than the number of reception branches possessed by the wireless communication apparatus n, the communication control unit 50 first evaluates the reception quality of each reception branch (step S91). The communication control unit 50 selects k top-ranked branches in reception quality, allowing them to continue the reception operation, and disables (n-k) lower-ranked branches in reception quality (step S92). The unnecessary reception branches are disabled for the reception operation, thereby producing an effect of the lower power consumption.

The present invention has been described in detail with reference to specific embodiments. However, it is obvious that those skilled in the art can alter or modify the embodiments without departing from the scope and sprit of the invention.

The present invention applies to a variety of wireless communication systems, such as a SVD-MIMO scheme, for performing data transmission with spatial multiplexing and can reduce power consumption during packet detection and average power consumption, in a wireless communication apparatus.

The term "spatially multiplexed channel (spatial stream)" is employed in this specification. However, in a typical MIMO transmission scheme, one spatially multiplexed channel is transmitted from one transmission branch; therefore, there are cases where the expression "a transmission signal from one antenna" is employed. However, there are cases where one transmission signal is formed using a plurality of transmit antennas (=spatially multiplexed channels) in such a system for performing beamforming for example; therefore, the term "spatially multiplexed channel (spatial stream)" should be understood as a more common expression.

As examples of beamforming, there are Cyclic Delay Diversity (CDD) for determining the orientation of a beam at the discretion of a transmitter, irrespective of the feedback information of the communication apparatus at the other end, and SVD-MIMO for controlling a beam optimally using the feedback information from the communication apparatus at the other end, as described in this specification.

In each embodiment described in this specification, the Re-AGC-purpose MIMO training sequence which extends over all spatially-multiplexed channels is added immediately after the PHY header. However, the gist of the present invention is not limited to this structure. In the case where the Re-AGC-purpose MIMO training sequence does not exist, (n-m) reception branches that are disabled for the reception operation in the packet detection mode need to determine a reception signal amplitude level in some way before starting to receive the MIMO training sequence. The AGC gain of (n-m) reception branches needs to be determined using the AGC gain of m reception branches that have been operating or using the amplitude of one spatially-multiplexed channel that can be received at that time. This is not entirely inoperable. However, since there is a possibility that a signal from each spatially-multiplexed channel arrives having a signal level independent of a reception branch, it is not guaranteed that AGC is performed at an optimal level; therefore, this is not designated as an optimal frame format in terms of reception characteristics. Thus, from the viewpoint of the optimization of reception characteristics, it is assumed that the Re-AGC-purpose MIMO training sequence which extends over all spatially-multiplexed channels exists immediately after the PHY header as described in FIG. 3, in each embodiment described in this specification.

Further, in each embodiment described in this specification, the first packet detection is performed by one reception branch. However, this may be performed by the number of reception branches that is more than one and smaller than the number of all reception branches. This configuration decreases the effect of low power consumption but makes possible packet detection and reception even in the case of lower reception SNR. Therefore, this is effective in the case of performing low-bit-rate communication under a low SNR environment.

Further, in each embodiment described in this specification, the wireless communication apparatus always operates in the packet detection mode unless a reception signal arrives, and at least one reception branch is enabled. However, the gist of the present invention is not limited to this. For example, it is also possible that a sleep state is further defined and only a part of the reception branches are enabled to perform packet detection as described above, at fixed intervals.

That is, the present invention has been disclosed in the form of exemplification, and the contents of the specification should not be interpreted restrictively. To understand the gist of the present invention, the claims should be taken into consideration.

What is claimed is:

1. A wireless communication apparatus for performing packet communication using a plurality of transmission channels formed by spatial multiplexing, the wireless communication apparatus comprising:

a plurality of reception branches configured to receive a spatially multiplexed wireless signal;

a signal processor configured to process a signal received at each reception branch; and a controller configured to enable and disable each reception branch in accordance with a reception operation state, the controller performing packet detection using a part of the plurality of reception branches in a reception standby state and disabling reception operation of the remaining reception branches that do not perform packet detection;

and in response to detection of a packet, the controller transitioning from the reception standby state to a packet reception state, enabling reception branches that are disabled in the reception standby state, and allowing the reception branches to receive a spatially multiplexed signal.

2. The wireless communication apparatus according to claim 1, wherein the controller performs packet detection using one reception branch in a reception standby state.

3. The wireless communication apparatus according to claim 1, wherein in the reception standby state with part of the reception branches enabled, packet detection is performed using a signal section of a packet head that is not spatially multiplexed.

4. The wireless communication apparatus according to claim 1, wherein in the packet reception state, the controller enables only a necessary number of reception branches for receiving a spatially multiplexed signal and allows the necessary number of reception branches to perform reception processing.

5. The wireless communication apparatus according to claim 4, wherein in the packet reception state, the controller includes a necessary-number-of-branches determination device configured to determine the necessary number of reception branches for receiving a spatially multiplexed signal, an unnecessary-branch selector configured to select at least one reception branch unnecessary to receive a spatially multiplexed signal out of the plurality of reception branches in a reception standby state based on a result of determining the necessary number of branches, and a branch disable device configured to disable reception operation of the reception branch selected as an unnecessary branch.

6. The wireless communication apparatus according to claim 5, wherein the necessary-number-of-branches determination device determines the necessary number of reception branches based on a description of a header section in a spatially multiplexed packet received or a reception state of the packet.

7. The wireless communication apparatus according to claim 5, wherein based on reception quality information of each reception branch, the unnecessary-branch selector selects unnecessary branches a number of unnecessary branches being a difference between a total number of branches and the necessary number of reception branches.

8. The wireless communication apparatus according to claim 1, wherein in the packet reception state, the controller transitions to a second reception standby state when it is detected that an address of the wireless communication apparatus is not included in a destination of the packet and disables reception operation of reception branches that do not perform packet detection.

9. The wireless communication apparatus according to claim 8, wherein the packet includes
a training sequence that can be received by one reception branch,
a PHY header that can be received by one reception branch,
a MIMO training sequence that is received by a plurality of reception branches and is transmitted in a time-division manner for each spatially multiplexed channel for the sake of measuring a spatially multiplexed channel, and
a MIMO payload that is spatially multiplexed with MIMO.

10. The wireless communication apparatus according to claim 9, wherein in the second reception standby state, a second packet is detected by detecting the training sequence, using a part of the plurality of reception branches.

11. The wireless communication apparatus according to claim 10, wherein in response to detection of the second packet, the remaining reception branches are enabled, the PHY header being continuously demodulated and decoded with a second necessary number of reception branches for packet reception.

12. The wireless communication apparatus according to claim 10, wherein a destination address of the second packet is described in a head section of the MIMO payload; all reception branches receive the MIMO training sequence and also the destination address of the second packet described in the head section of the MIMO payload is demodulated and decoded; all reception branches continue the reception operation if the address of the wireless communication apparatus is included in a destination of the second packet; and the controller transitions to a third reception standby state and disables reception operation of reception branches that do not perform packet detection if the address of the wireless communication apparatus is not included in a destination of the second packet.

13. The wireless communication apparatus according to claim 10, wherein the second necessary number of reception branches for reception is determined before the MIMO payload is decoded, and the controller continues enabling the second necessary number of reception branches.

14. The wireless communication apparatus according to claim 13, wherein in the case where information as to a number of spatially multiplexed channels transmitted is described in the PHY header, the MIMO training sequence and at least a head section of the MIMO payload are received based on the number of spatially multiplexed channels.

15. The wireless communication apparatus according to claim 13, wherein in the case where information as to the number of spatially multiplexed channels transmitted is described in the PHY header, the second necessary number of reception branches or more continue receiving a specified section after the packet is detected so that reception quality information of each reception branch is obtained, and using only the necessary number of reception branches selected in decreasing order of reception quality, at least a head section of the MIMO payload is received.

16. The wireless communication apparatus according to claim 15, wherein the necessary number of reception branches or more continue receiving until a section of the MIMO training sequence is received for the sake of obtaining reception quality information.

17. The wireless communication apparatus according to claim 13, wherein in the case where it is specified that the number of spatially multiplexed channels is detected at the time of receiving the MIMO training sequence, the second necessary number of reception branches or more continue receiving until the section of the MIMO training sequence is received, and using only a number of reception branches that corresponds to the detected number of spatially multiplexed channels, at least a head section of the MIMO payload is received.

18. The wireless communication apparatus according to claim 17, wherein the second necessary number of reception branches or more continue receiving until the section of the MIMO training sequence is received, and using only the number of reception branches selected according to reception quality that corresponds to the detected number of spatially multiplexed channels, at least a head section of the MIMO payload is received.

19. A wireless communication method for performing reception processing on a spatially multiplexed transmission signal using a plurality of reception branches, the wireless communication method comprising:
a reception standby step of performing packet detection using a part of the plurality of reception branches and disabling reception operation of the remaining reception branches that do not perform packet detection; and
a packet reception step of enabling reception branches in response to detection of a packet, which are disabled in a reception standby state, in order to allow the reception branches to receive a spatially multiplexed signal.

20. A computer-readable medium storing a computer program described in computer-readable form so as to allow a computer system to execute processing for performing reception processing on a spatially multiplexed transmission signal using a plurality of reception branches, the computer program comprising:
a reception standby step of performing packet detection using a part of the plurality of reception branches and disabling reception operation of the remaining reception branches that do not perform packet detection; and
a packet reception step of enabling reception branches in response to detection of a packet, which are disabled in a reception standby state, in order to allow the reception branches to receive a spatially multiplexed signal.

* * * * *